US011029687B2

(12) United States Patent
Herbach et al.

(10) Patent No.: US 11,029,687 B2
(45) Date of Patent: *Jun. 8, 2021

(54) TRAJECTORY ASSISTANCE FOR AUTONOMOUS VEHICLES

(71) Applicant: Waymo LLC, Mountain View, CA (US)

(72) Inventors: Joshua Seth Herbach, Mountain View, CA (US); Nathaniel Fairfield, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 241 days.

This patent is subject to a terminal disclaimer.

(21) Appl. No.: 15/899,208

(22) Filed: Feb. 19, 2018

(65) Prior Publication Data

US 2018/0196437 A1     Jul. 12, 2018

Related U.S. Application Data

(63) Continuation of application No. 15/372,071, filed on Dec. 7, 2016, now Pat. No. 9,933,784, which is a
(Continued)

(51) Int. Cl.
*G06F 17/00* (2019.01)
*G05D 1/02* (2020.01)
(Continued)

(52) U.S. Cl.
CPC .......... *G05D 1/0212* (2013.01); *B60W 30/00* (2013.01); *G01C 21/34* (2013.01); *G05D 1/0214* (2013.01);
(Continued)

(58) Field of Classification Search
CPC .............. G05D 1/0212; G05D 1/0231; G05D 2201/0213; G05D 1/0297; G05D 1/0214;
(Continued)

(56) References Cited

U.S. PATENT DOCUMENTS 5,983,161 A * 11/1999 Lemelson ............... G01S 19/11
340/436
6,480,783 B1 * 11/2002 Myr ...................... G01C 21/3492
340/990

(Continued)

*Primary Examiner* — Ronnie M Mancho
(74) *Attorney, Agent, or Firm* — McDonnell Boehnen Hulbert & Berghoff LLP

(57) ABSTRACT

An autonomous vehicle may include a stuck condition detection component and a communications component. The stuck-detection component may be configured to detect a condition in which the autonomous vehicle is impeded from navigating according to a first trajectory. The communications component may send an assistance signal to an assistance center and receive a response to the assistance signal. The assistance signal may include sensor information from the autonomous vehicle. The assistance center may include a communications component and a trajectory specification component. The communications component may receive the assistance signal and send a corresponding response. The trajectory specification component may specify a second trajectory for the autonomous vehicle and generate the corresponding response that includes a representation of the second trajectory. The second trajectory may be based on the first trajectory and may ignore an object that obstructs the first trajectory.

20 Claims, 19 Drawing Sheets

Related U.S. Application Data continuation of application No. 14/679,471, filed on Apr. 6, 2015, now Pat. No. 9,541,410, which is a continuation of application No. 13/837,573, filed on Mar. 15, 2013, now Pat. No. 9,008,890.

(51) Int. Cl.
*B60W 30/00* (2006.01)
*G01C 21/34* (2006.01)
*G07C 5/00* (2006.01)

(52) U.S. Cl.
CPC ......... *G05D 1/0231* (2013.01); *G05D 1/0297* (2013.01); *G07C 5/008* (2013.01); *G05D 2201/0213* (2013.01)

(58) Field of Classification Search
CPC ... G07C 5/008; B60W 30/00; B60W 2554/00; B60W 40/04; G01C 21/34
USPC ........................................................ 701/1, 26
See application file for complete search history.

(56) References Cited

U.S. PATENT DOCUMENTS

| | | | | |
|---|---|---|---|---|
| 6,792,351 B2* | 9/2004 | Lutter | ................. | G08G 1/0965 701/418 |
| 8,843,309 B2* | 9/2014 | Kimchi | ................. | G01C 21/26 348/159 |
| 8,855,847 B2* | 10/2014 | Uehara | ............. | G01C 21/3691 701/25 |
| 8,884,782 B2* | 11/2014 | Rubin | ..................... | G08G 9/02 340/905 |
| 8,965,677 B2* | 2/2015 | Breed | ................... | B60W 30/04 701/301 |
| 9,008,890 B1* | 4/2015 | Herbach | ............... | B60W 30/00 701/26 |
| 9,130,930 B2* | 9/2015 | Kennedy | ................. | B60R 25/04 |
| 9,189,730 B1* | 11/2015 | Coenen | ................. | G06N 3/049 |
| 9,381,916 B1* | 7/2016 | Zhu | .................... | B60W 30/0956 |
| 9,429,943 B2* | 8/2016 | Wilson | ................. | G05D 1/0246 |
| 9,495,874 B1* | 11/2016 | Zhu | ....................... | G05D 1/0088 |
| 2005/0134440 A1* | 6/2005 | Breed | .................. | B60N 2/2863 340/435 |
| 2007/0087756 A1* | 4/2007 | Hoffberg | ............ | G06Q 10/0631 455/450 |
| 2007/0213092 A1* | 9/2007 | Geelen | ................... | G08G 1/005 455/556.1 |
| 2008/0133120 A1* | 6/2008 | Romanick | ......... | G01C 21/3469 701/123 |
| 2009/0140887 A1* | 6/2009 | Breed | .................. | G01C 21/165 340/990 |
| 2010/0100307 A1* | 4/2010 | Kim | ...................... | G01S 5/0027 701/119 |
| 2010/0253595 A1* | 10/2010 | Szczerba | .............. | G01C 21/365 345/7 |
| 2012/0130630 A1* | 5/2012 | Tang | ................... | G01C 21/3415 701/413 |
| 2014/0012494 A1* | 1/2014 | Cudak | ............... | G01C 21/3415 701/412 |
| 2014/0081895 A1* | 3/2014 | Coenen | ................ | G05B 13/027 706/25 |
| 2014/0207325 A1* | 7/2014 | Mudalige | ............ | B62D 15/025 701/26 |
| 2014/0309789 A1* | 10/2014 | Ricci | ....................... | B60Q 1/00 700/276 |
| 2014/0309864 A1* | 10/2014 | Ricci | ...................... | H04W 4/21 701/36 |
| 2015/0105933 A1* | 4/2015 | Martin | ................ | G07C 5/0866 701/1 |
| 2015/0197248 A1* | 7/2015 | Breed | .................. | G08G 1/09626 701/93 |
| 2015/0202770 A1* | 7/2015 | Patron | .................... | G05D 1/024 700/245 |

* cited by examiner

300

310
Determine that an autonomous vehicle seeks assistance to navigate in accordance with a first trajectory, where the autonomous vehicle is configured to receive and store data about a plurality of obstacles, and where a particular obstacle in the plurality of obstacles partially or wholly obstructs the first trajectory

320
Select a portion of the stored data, where the portion of the stored data is less than the totality of the stored data and includes data representing the particular obstacle

330
Provide the portion of the stored data

340
Receive a second trajectory, where the second trajectory is not obstructed by the particular obstacle

FIG. 3

TRAJECTORY ASSISTANCE FOR AUTONOMOUS VEHICLES

CROSS-REFERENCE TO RELATED APPLICATIONS

This application claims priority to U.S. patent application Ser. No. 15/372,071, filed Dec. 7, 2016, which is hereby incorporated by reference in its entirety. U.S. patent application Ser. No. 15/372,071 claims priority to U.S. Pat. No. 9,541,410, issued Jan. 10, 2017, which is hereby incorporated by reference in its entirety. U.S. Pat. No. 9,541,410 claims priority to U.S. Pat. No. 9,008,890, issued Apr. 14, 2015, which is hereby incorporated by reference in its entirety.

BACKGROUND

Some vehicles are configured to operate in an autonomous mode in which the vehicle navigates through an environment with little or no input from a driver. Such an autonomous vehicle (or AV) typically includes one or more sensors that are configured to sense information about the environment. The autonomous vehicle may use the sensed information to navigate through the environment. For example, if the sensors determine that the autonomous vehicle is approaching an obstacle, the vehicle may be able to navigate around the obstacle. An autonomous vehicle may operate in various weather and lighting conditions, such as, but not limited to, days, nights, good visibility conditions, and/or reduced visibility conditions.

SUMMARY

In one aspect, a system is provided. The system may include an autonomous vehicle and an assistance center. The autonomous vehicle may include a stuck condition detection component and a communications component. The stuck condition detection component may be configured to detect a condition in which the autonomous vehicle is impeded from navigating according to a first trajectory. The communications component may be configured at least to send an assistance signal indicating that the autonomous vehicle seeks assistance navigating according to the first trajectory, and to receive a response to the assistance signal. The assistance signal may include sensor information of the autonomous vehicle, indicating low-level sensor strike input and high-level, polygonal or polyhedral representations of objects in the vicinity of the autonomous vehicle. The assistance center may include a communications component and a trajectory specification component. The communications component may be configured at least to receive the assistance signal, and to send the response to the assistance signal. The trajectory specification component may be configured to specify a second trajectory for the autonomous vehicle and to generate the response to the assistance signal including a representation of the second trajectory. The second trajectory may be based on the first trajectory. The second trajectory may ignore the presence of at least part of one high-level, polygonal or polyhedral representation of an object that obstructs the first trajectory.

In another aspect, a method is provided. An autonomous vehicle may detect a condition in which the autonomous vehicle is impeded from navigating according to a first trajectory. The autonomous vehicle may send, to an assistance center, an assistance signal that the autonomous vehicle seeks assistance navigating according to the first trajectory. The assistance signal may include sensor information of the autonomous vehicle indicating low-level sensor strike input and high-level, polygonal or polyhedral representations of objects in the vicinity of the autonomous vehicle. The autonomous vehicle may receive a response to the assistance signal. The response may include a representation of a second trajectory, where the second trajectory is based on the first trajectory. The second trajectory may ignore the presence of at least part of one high-level, polygonal or polyhedral representation of an object that obstructs the first trajectory.

In another aspect, an autonomous vehicle is provided. The autonomous vehicle may include one or more processors and a non-transitory computer readable medium storing instructions that, when executed by the one or more processors, cause the autonomous vehicle to perform functions. The functions may include detecting a condition in which the autonomous vehicle is impeded from navigating according to a first trajectory. The functions may also include sending an assistance signal, from the autonomous vehicle to an assistance center, that the autonomous vehicle seeks assistance navigating according to the first trajectory. The assistance signal may include sensor information of the autonomous vehicle indicating low-level sensor strike input and high-level, polygonal or polyhedral representations of objects in the vicinity of the autonomous vehicle. The functions may also include receiving a response to the assistance signal. The response may include a representation of a second trajectory that could be based on the first trajectory. The second trajectory may ignore the presence of at least part of one high-level, polygonal or polyhedral representation of an object that obstructs the first trajectory.

In another aspect, a device is provided. The device may include means for detecting a condition in which navigation according to a first trajectory is impeded, and means for sending an assistance signal to an assistance center seeking assistance to navigate according to the first trajectory. The assistance signal may include sensor information indicating low-level sensor strike input and high-level, polygonal or polyhedral representations of objects in the vicinity of the device. The device may also include means for receiving a response to the assistance signal from the assistance center. The response may include a representation of a second trajectory, where the second trajectory may be based on the first trajectory, and where the second trajectory may ignore the presence of at least part of one high-level, polygonal or polyhedral representation of an object that obstructs the first trajectory.

In another aspect, a method is provided. It may be determined that a speed of an autonomous vehicle is less than or equal to a threshold speed, and that the autonomous vehicle has not detected a traffic control signal. A cause C may be identified for the speed to be less than or equal to the threshold speed. A timer T may be started, where the timer T may be based on the cause C. After the timer T expires, it may be determined whether the cause C remains for the speed to be less than or equal to the threshold speed. After determining that the cause C remains for the speed to be less than or equal to the threshold speed, an assistance signal may be sent by the autonomous vehicle indicating that the autonomous vehicle is stuck.

In another aspect, an autonomous vehicle is provided. The autonomous vehicle may include one or more processors and data storage storing program instructions that, when executed by the one or more processors, cause the autonomous vehicle to perform functions. The functions may include determining that a speed is less than or equal to a threshold speed and that a traffic control signal has not been detected. The functions may also include identifying a cause C for the speed to be less than or equal to the threshold speed, and starting a timer T. The functions may further include, after the timer T expires, determining whether the cause C remains for the speed to be less than or equal to the threshold speed, and, after determining that the cause C remains for the speed to be less than or equal to the threshold speed, sending an assistance signal indicating that that the autonomous vehicle is stuck. The timer T may be based on the cause C.

In another aspect, a non-transitory computer readable medium is provided. The non-transitory computer readable medium may store instructions thereon that, when executed by one or more processors, cause the one or more processors to perform functions. The functions may include determining that a speed is less than or equal to a threshold speed, and that a traffic control signal has not been detected. The functions may also include identifying a cause C for the speed to be less than or equal to the threshold speed, and starting a timer T. The functions may further include, after the timer T expires, determining whether the cause C remains for the speed to be less than or equal to the threshold speed, and, after determining that the cause C remains for the speed to be less than or equal to the threshold speed, sending an assistance signal indicating that an autonomous vehicle is stuck. The timer T may be based on the cause C.

In another aspect, a device is provided. The device may include means for determining that a speed is less than or equal to a threshold speed and that a traffic control signal has not been detected. The device may also include means for identifying a cause C for the speed to be less than or equal to the threshold speed, and means for starting a timer T. The device may further include means for, after the timer T expires, determining whether the cause C remains as a cause for the speed to be less than or equal to the threshold speed, and means for, after determining that the cause C remains the cause for the speed to be less than or equal to the threshold speed, sending an assistance signal indicating that the device is stuck. The timer T may be based on the cause C.

In another aspect, a method is provided. An autonomous vehicle may determine to seek assistance to navigate in accordance with a first trajectory. The autonomous vehicle may be configured to receive and store data about a plurality of obstacles. A particular obstacle in the plurality of obstacles may partially or wholly obstruct the first trajectory. The autonomous vehicle may select a portion of the stored data, where the portion of the stored data is less than the totality of the stored data and includes data representing the particular obstacle. The portion of the stored data may be provided to an assistance center. A second trajectory may be received from the assistance center, where the second trajectory is not obstructed by the particular obstacle.

In another aspect, an autonomous vehicle is provided. The autonomous vehicle include one or more processors and data storage storing program instructions thereon that, when executed by the one or more processors, cause the autonomous vehicle to perform functions. The functions may include determining to seek assistance to navigate in accordance with a first trajectory. The data storage may be configured to receive and store data about a plurality of obstacles, and a particular obstacle in the plurality of obstacles may partially or wholly obstruct the first trajectory. The functions may also include selecting a portion of the stored data. The selected portion of the stored data may be less than the totality of the stored data and may include data representing the particular obstacle. The functions may further include providing, to an assistance center, the portion of the stored data, and receiving, from the assistance center, a second trajectory. The second trajectory might not be obstructed by the particular obstacle.

In another aspect, a non-transitory computer readable medium is provided. The non-transitory computer readable medium may store instructions thereon that, when executed by one or more processors, cause the one or more processors to perform functions. The functions may include determining to seek assistance to navigate an autonomous vehicle in accordance with a first trajectory. The autonomous vehicle may be configured to receive and store data about a plurality of obstacles, and a particular obstacle in the plurality of obstacles may partially or wholly obstruct the first trajectory. The functions may include selecting a portion of the stored data. The selected portion of the stored data may be less than the totality of the stored data and may include data representing the particular obstacle. The functions may further include providing, to an assistance center, the portion of the stored data, and receiving, from the assistance center, a second trajectory. The second trajectory might not be obstructed by the particular obstacle.

In another aspect, a device is provided. The device may include means for determining to seek assistance to navigate an autonomous vehicle in accordance with a first trajectory. The autonomous vehicle may be configured to receive and store data about a plurality of obstacles, and a particular obstacle in the plurality of obstacles may partially or wholly obstruct the first trajectory. The device may also include means for selecting a portion of the stored data. The selected portion of the stored data may be less than the totality of the stored data and may include data representing the particular obstacle. The device may further include means for providing, to an assistance center, the portion of the stored data, and means for receiving, from the assistance center, a second trajectory. The second trajectory might not be obstructed by the particular obstacle.

In another aspect, a method is provided. An assistance center may receive a representation of a first trajectory of an autonomous vehicle that is in a stuck condition, where the first trajectory does not relieve the stuck condition. The assistance center may receive sensor information of the autonomous vehicle, where the sensor information may include low-level sensor strike input and high-level, polygonal or polyhedral representations of objects in the vicinity of the autonomous vehicle. The high-level, polygonal or polyhedral representations of objects may be based, at least in part, on the low-level sensor strike input. Based on the first trajectory and the sensor information, the assistance center may determine a second trajectory that relieves the stuck condition while adhering to at least some navigational constraints. Relieving the stuck condition may include ignoring at least one high-level, polygonal or polyhedral representation of an object that obstructs the first trajectory. The assistance center may transmit a representation of the second trajectory and instructions for the autonomous vehicle to drive in accordance with the second trajectory.

In another aspect, a non-transitory computer readable medium is provided. The non-transitory computer readable medium may store instructions thereon that, when executed by a computing device, cause the computing device to perform functions. The functions may include receiving a representation of a first trajectory of an autonomous vehicle that is in a stuck condition. The first trajectory might not relieve the stuck condition. The functions may also include receiving sensor information of the autonomous vehicle, where the sensor information may include low-level sensor strike input and high-level, polygonal or polyhedral representations of objects in the vicinity of the autonomous vehicle. The high-level, polygonal or polyhedral representations of objects may be based, at least in part, on the low-level sensor strike input. The functions may further include, based on the first trajectory and the sensor information, determining a second trajectory that may relieve the stuck condition while adhering to at least some navigational constraints. Relieving the stuck condition may include ignoring at least one high-level, polygonal or polyhedral representation of an object that obstructs the first trajectory. The functions may additionally include transmitting a representation of the second trajectory and instructions for the autonomous vehicle to drive in accordance with the second trajectory.

In another aspect, a device is provided. The device may include means for receiving a representation of a first trajectory of an autonomous vehicle that is in a stuck condition. The first trajectory might not relieve the stuck condition. The device may also include means for receiving sensor information of the autonomous vehicle, where the sensor information may include low-level sensor strike input and high-level, polygonal or polyhedral representations of objects in the vicinity of the autonomous vehicle. The high-level, polygonal or polyhedral representations of objects may be based, at least in part, on the low-level sensor strike input. The device may also include means for determining a second trajectory, based on the first trajectory and the sensor information, which relieves the stuck condition while adhering to at least some navigational constraints. Relieving the stuck condition may include ignoring at least one high-level, polygonal or polyhedral representation of an object that obstructs the first trajectory. The device may additionally include means for transmitting a representation of the second trajectory and instructions for the autonomous vehicle to drive in accordance with the second trajectory.

The foregoing summary is illustrative only and is not intended to be in any way limiting. In addition to the illustrative aspects, appearances, embodiments, and features described above, further aspects, appearances, embodiments, and features will become apparent by reference to the figures and the following detailed description.

BRIEF DESCRIPTION OF THE DRAWINGS

FIG. 3 is a flow chart of yet another example method, according to an example embodiment.

DETAILED DESCRIPTION

Figure 1:
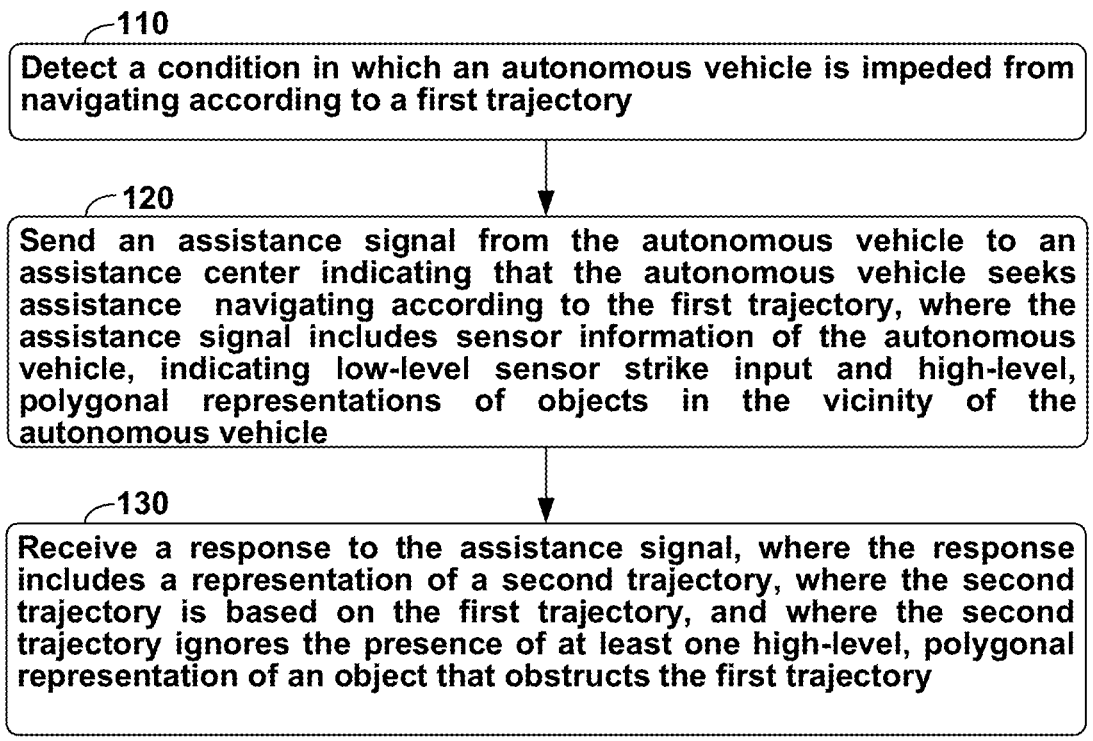
FIG. 1 is a flow chart of an example method, according to an example embodiment.

Autonomous vehicles may navigate by using a number of sensors to collect information about objects in the vicinity of the autonomous vehicle, and by determining trajectories for the autonomous vehicle based on this collected information. For instance, an autonomous vehicle may be equipped with one or more video cameras, still cameras, radar units, Light Detection and Ranging (LIDAR) units, Global Positioning System (GPS) units, and/or perhaps other types of location-determining or object-detection technologies.

For instance, the autonomous vehicle may be configured with a LIDAR unit to generate the low-level data about nearby environmental features. The LIDAR unit may estimate distances to these environmental features while scanning through the surroundings of the autonomous vehicle. Thus, the LIDAR unit may assemble a cloud of point positions indicative of the three-dimensional shapes of objects in the surroundings. Individual points may be measured by generating a laser pulse and detecting a returning pulse, if any, reflected from an environmental object, and determining the distance to the reflective object according to the time delay between the emitted pulse and the reception of the reflected pulse.

The laser, or set of lasers, may be rapidly and repeatedly scanned across the surroundings to provide continuous, or nearly continuous, real-time information on distances to the objects therein. Combining the measured distances, and the orientation of the laser(s) while measuring each distance, allows for associating a three-dimensional position with each returning pulse. In this way, a three-dimensional map of points of reflective features can be generated based on the returning pulses for the entire scanning zone. Using the three-dimensional point map, high-level data defining the relative sizes, shapes, velocities, and trajectories of various objects (such as other vehicles, pedestrians, trees, structures, etc.) can be inferred. These objects may be represented as polygons or polyhedrons, or by other two-dimensional or three-dimensional representations.

From this information, as well as possible navigational requests from one or more users or controllers of the autonomous vehicle, the autonomous vehicle may develop a trajectory that it can drive from a starting point (e.g., the autonomous vehicle's current location) to an endpoint (e.g., a destination). The trajectory may also specify some number of intermediate waypoints through which the autonomous vehicle should pass while navigating from the starting point to the endpoint.

While driving in accordance with such a trajectory, the autonomous vehicle may adhere to navigational constraints. For instance, the autonomous vehicle may take steps to avoid collisions, to avoid breaking traffic laws (e.g., staying in the proper lane, obeying the speed limit, and stopping fully at stop signs), and to avoid causing inertial discomfort to passengers (e.g., rapid acceleration or deceleration, sudden turns, and so on) unless absolutely necessary. The autonomous vehicle may make use of low-level and high-level sensor information in order to adhere to these constraints. Thus, for example, if the autonomous vehicle detects an obstacle in its trajectory, it may make modifications to the trajectory in order to avoid the obstacle.

In some scenarios, an autonomous vehicle may enter into a "stuck" condition. The stuck condition may be, for instance, a condition where the autonomous vehicle might not be able to navigate in accordance with an original trajectory without relaxing any of its navigational constraints. For example, an autonomous vehicle may be configured with constraint(s) to "stay on the road" and "do not back up while on the road." Then, while driving, the autonomous vehicle may determine that the road ahead is completely obstructed by a large object. Even if a shoulder of the road and/or the road behind the autonomous vehicle is clear, the autonomous vehicle may not be able to navigate around or away from the large object. Thus, the autonomous vehicle may determine that it is in a stuck condition.

Detecting when the autonomous vehicle is stuck may be a complex problem. Some approaches may generate an excessive number of false positive results. This may lead to over-allocation of resources to assist stuck autonomous vehicles. Other approaches lead to excessive amount of waiting until the autonomous vehicle determines that it is in a stuck condition.

As an example, consider a heuristic of setting a timer whenever the autonomous vehicle stops, and alerting when the stoppage lasts longer than a threshold N seconds. If the threshold N is set to 5 seconds, alerts may be sent while waiting for stop lights, when the autonomous vehicle is in stop and go freeway traffic, and when the autonomous vehicle is navigating stop signs at busy intersections. These alerts are likely to be considered false positives. On the other hand, if N is set to 600 seconds (10 minutes), the autonomous vehicle may wait behind a double parked car on an otherwise empty street for at least 10 minutes. In this situation, the waiting may result in a poor user experience.

Upon determining that the autonomous vehicle is in a stuck condition, the autonomous vehicle may send an assistance request to an assistance center to request assistance. This assistance request may include the location of the autonomous vehicle, as well as some basic data from one or more of the autonomous vehicle's sensors. In response, the assistance center may either accept or reject the assistance request. If the request is accepted, the assistance center may send a new trajectory for use by the autonomous vehicle.

In some cases, in order to provide the navigational assistance, the assistance center may determine that it would benefit from additional data from the autonomous vehicle. The additional data may include data that is too expensive or burdensome for the autonomous vehicle to transmit to the assistance center by default. Low-level data, such as clusters of laser strikes on surfaces in the vicinity of the autonomous vehicle, may be useful to the assistance center. For example, the laser strike data is generally more accurate than high-level object data that may be, at least partially, inferred from the laser strike data.

The low-level data may be useful to an expert in the assistance center, such as a human expert and/or an expert system. However, the autonomous vehicle may generate a large enough volume of low-level data to be impractical for the autonomous vehicle to regularly transmit. Instead, the autonomous vehicle may use heuristics to reduce the extent of transmitted data, such as but not limited to restricting the number of obstacles or objects to report based on proximity to the autonomous vehicle, sorting objects based on the autonomous vehicle's trajectory or location or perceived importance of the objects, and/or preferring expert-friendly types of data for transmission. Additionally, or alternatively, the autonomous vehicle may restrict the data to high-level (e.g., polygonal or polyhedral) representations of these objects that were derived from the low-level data.

Being able to determine when an autonomous vehicle is stuck and then when to request assistance may significantly reduce the extent of experts used to operate a fleet of autonomous vehicles. Such an expert, for instance as a human or an expert system, may be at an assistance center waiting for assistance requests. As such, one expert at an assistance center may assist multiple autonomous vehicles. Thus, if stuck conditions can be efficiently and effectively detected, experts may be freed up for other tasks and the operating costs of autonomous vehicles may be reduced.

Turning to the figures, FIG. 1 is a flow chart of method 100, according to an example embodiment. Method 100 may be carried out by an autonomous vehicle, such as described below in the context of at least FIGS. 16 and 18.

At block 110, an autonomous vehicle may detect a condition in which the autonomous vehicle is impeded from navigating according to a first trajectory, such as discussed below in the context of at least FIGS. 6 and 7.

At block 120, the autonomous vehicle may send an assistance signal to an assistance center, such as discussed below in the context of at least FIGS. 8-10 and 15A-15C. The assistance signal may indicate that the autonomous vehicle seeks assistance navigating according to the first trajectory. The assistance signal may include sensor information of the autonomous vehicle. The sensor information may indicate low-level sensor strike input, such as laser strike input discussed below in the context of FIGS. 11-14, and/or high-level, polygonal or polyhedral representations of objects in the vicinity of the autonomous vehicle, such as discussed previously, as well as below in the context of FIGS. 11-15C.

At block 130, the autonomous vehicle may receive a response to the assistance signal, such as discussed below in the context of at least FIGS. 8-10 and 15A-15C. The response may include a representation of a second trajectory, where the second trajectory may be based on the first trajectory. The second trajectory may ignore the presence of at least part of one high-level, polygonal or polyhedral representation of an object that obstructs the first trajectory, such as discussed below at least in the context of FIGS. 5, 8-10, 15A-15C, and 17. For example, an expert at the assistance center may have determined that the object does not fully obstruct the first trajectory, and therefore may be at least partially ignored.

In some embodiments, the second trajectory may include a path defined by a plurality of points. The path defined by the plurality of points may include a spline connecting at least two points in the plurality of points.

Method 100 may include determining the second trajectory using an expert entity at the assistance center. The second trajectory may be determined based on the assistance signal and the sensor information. In some embodiments, the expert entity may include a human expert. In other embodiments, the expert entity may include a computing system.

In further embodiments, method 100 may include the autonomous vehicle obtaining the second trajectory from the response, and driving according to the second trajectory. Driving the autonomous vehicle according to the second trajectory may include driving according to the first trajectory after driving according to the second trajectory. For instance, the second trajectory may avoid one or more obstacles, and then may lead back to the first trajectory. In some cases, the autonomous vehicle may validate the second trajectory prior to driving according to the second trajectory.

Figure 2:
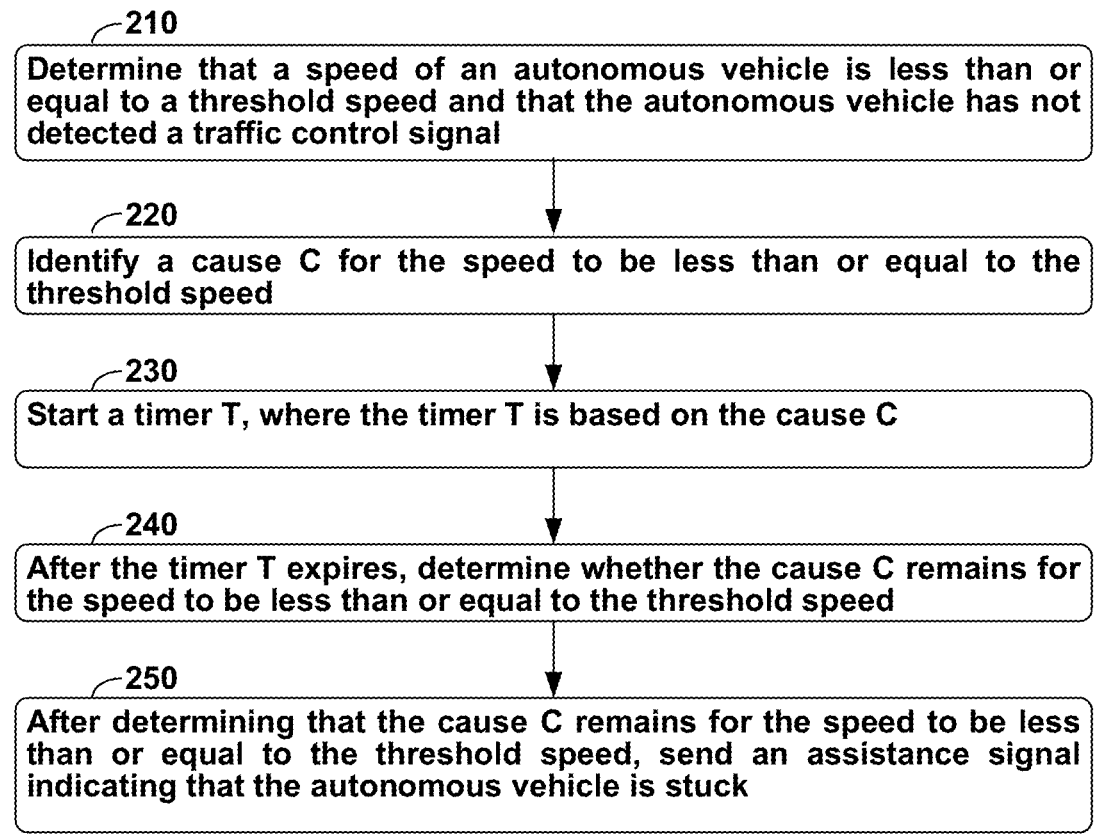
FIG. 2 is a flow chart of another example method, according to an example embodiment.

FIG. 2 is a flow chart of method 200, according to an example embodiment. Method 200 may be carried out by an autonomous vehicle, such as described below in the context of at least FIGS. 16 and 18.

At block 210, a determination may be made that a speed of an autonomous vehicle is less than or equal to a threshold speed and that the autonomous vehicle has not detected a traffic control signal, such as discussed below in more detail in the context of at least FIGS. 6 and 7. In some embodiments, determining that the speed of the autonomous vehicle is less than or equal to the threshold speed may include determining that the autonomous vehicle is not increasing speed. The traffic control signal may include be a stop sign signal, a stop light signal, a warning sign signal, and a warning light signal. The threshold speed may be between zero and one meter per second, between zero and three meters per second, between zero and five meters per second, and so on.

At block 220, a cause C may be identified for the speed to be less than or equal to the threshold speed, such as discussed below in more detail in the context of at least FIG. 7. In some embodiments, the cause C may be based on a pedestrian, based on a vehicle other than the autonomous vehicle, and/or based on another type of object. The cause C may obstruct a trajectory of the autonomous vehicle.

At block 230, a timer T that is based on the cause C may be started, such as discussed below in more detail in the context of at least FIG. 7. At block 240, after the timer T expires, a determination may be made whether the speed is still less than or equal to the threshold speed and/or the cause C remains as a cause for the speed to be less than or equal to the threshold speed, such as discussed below in more detail in the context of at least FIG. 7. If this is the case, then, at block 250, an assistance signal indicating that the autonomous vehicle is stuck may be sent from the autonomous vehicle, such as discussed below in more detail in the context of at least FIG. 7.

In some embodiments, method 200 may further include, after sending the assistance signal, determining that the speed of the autonomous vehicle is greater than the threshold speed. Then, based on determining that the speed of the autonomous vehicle is greater than the threshold speed, a determination may be made that the autonomous vehicle is no longer stuck. In this case, the autonomous vehicle may no longer seek out assistance, and may transmit a message to the assistance center indicating that the request for assistance is cancelled.

Method 200 may also include the autonomous vehicle receiving a response to the assistance signal, where the response specifies a second trajectory for the autonomous vehicle, and navigating according to the second trajectory. The second trajectory may avoid the obstruction of cause C. In particular embodiments, method 200 may further include, after navigating according to the second trajectory, determining that the autonomous vehicle may safely return to navigating according to the trajectory. In response to determining that the autonomous vehicle may return to navigating according to the trajectory, the autonomous vehicle may switch from navigating according to the second trajectory to navigating according to the trajectory.

FIG. 3 is a flow chart of method 300, according to an example embodiment. Method 300 may be carried out by an autonomous vehicle, such as described below in the context of at least FIGS. 16 and 18.

At block 310, the autonomous vehicle may determine to seek assistance to navigate in accordance with a first trajectory. The autonomous vehicle may be configured to receive and store data about a plurality of obstacles. A particular obstacle in the plurality of obstacles may partially or wholly obstruct the first trajectory, such as discussed below in the context of at least FIGS. 5-17. In some embodiments, the stored data may include sensor data about the plurality of obstacles, where the sensor data may comprise representations of distances between the autonomous vehicle and at least some obstacles in the plurality of obstacles, such as discussed below in the context of at least FIGS. 10-15C.

In full generality, one or more particular obstacles may obstruct the first trajectory. For instance, the autonomous vehicle may determine that two, three, or more obstacles are obstructing its trajectory. The autonomous vehicle may take action, in accordance with method 300 and/or any other embodiment herein, to navigate around or otherwise avoid these obstacles. However, for sake of simplicity, some examples herein discuss such processes in the context of a single obstacle.

At block 320, the autonomous vehicle may select a portion of the stored data. The selected portion of the stored data may be less than the totality of the stored data and may include data representing the particular obstacle, such as discussed below in the context of at least FIGS. 10 and 15A-15C. In some embodiments, the stored data may include video data about the plurality of obstacles. Then, selecting the portion of the stored data may include selecting at least some of the video data, such as discussed below in the context of at least FIGS. 8, 10, and 15A-15C.

Selecting the portion of the stored data may include determining a threshold distance D. Then, for each obstacle O1 in the plurality of obstacles, a distance D1 between the obstacle O1 and the autonomous vehicle may be determined. A further determination may be made whether the threshold distance D is greater than the distance D1. If the threshold distance D is greater than the distance D1, the obstacle O1 may be identified as a candidate obstacle for the portion of the stored data. In particular embodiments, selecting the portion of the stored data may include selecting stored data for each candidate obstacle.

In some embodiments, selecting the portion of the stored data additionally may include making a determination of a number N of obstacles in the plurality of obstacles, where N>0. Then, for each candidate obstacle O2 in the plurality of obstacles, a determination may be made whether the candidate obstacle O2 is one of N obstacles closest to the autonomous vehicle. If the candidate obstacle O2 is one of the number N obstacles closest to the autonomous vehicle, stored data about the candidate obstacle O2 may be selected.

In further embodiments, selecting the portion of the stored data about the plurality of obstacles may include determining a threshold distance D2. Then, for each obstacle O1 in the plurality of obstacles, a determination may be made of a closest distance value D3 between the obstacle O1 and a closest point on the original trajectory to O1. The plurality of obstacles may be sorted based on the closest distance values D3. Stored data about for obstacles with a closest distance value D3 less than the threshold distance D2 may be selected.

At block 330, the portion of the stored data may be provided to an assistance center, such as discussed below in the context of at least FIGS. 10 and 15A-15C. In some embodiments, providing the portion of the stored data may include transmitting a request for navigational assistance, receiving a request for information regarding obstacles, and transmitting the portion of the stored data, such as discussed below in the context of at least FIG. 10. This communication may take place between the autonomous vehicle and the assistance center.

At block 340, a second trajectory may be received from the assistance center. The second trajectory might not be obstructed by the particular obstacle, such as discussed below in the context of at least FIGS. 8-10 and 15A-15C. In some embodiments, the second trajectory may meet the first trajectory at two or more points.

Figure 4:
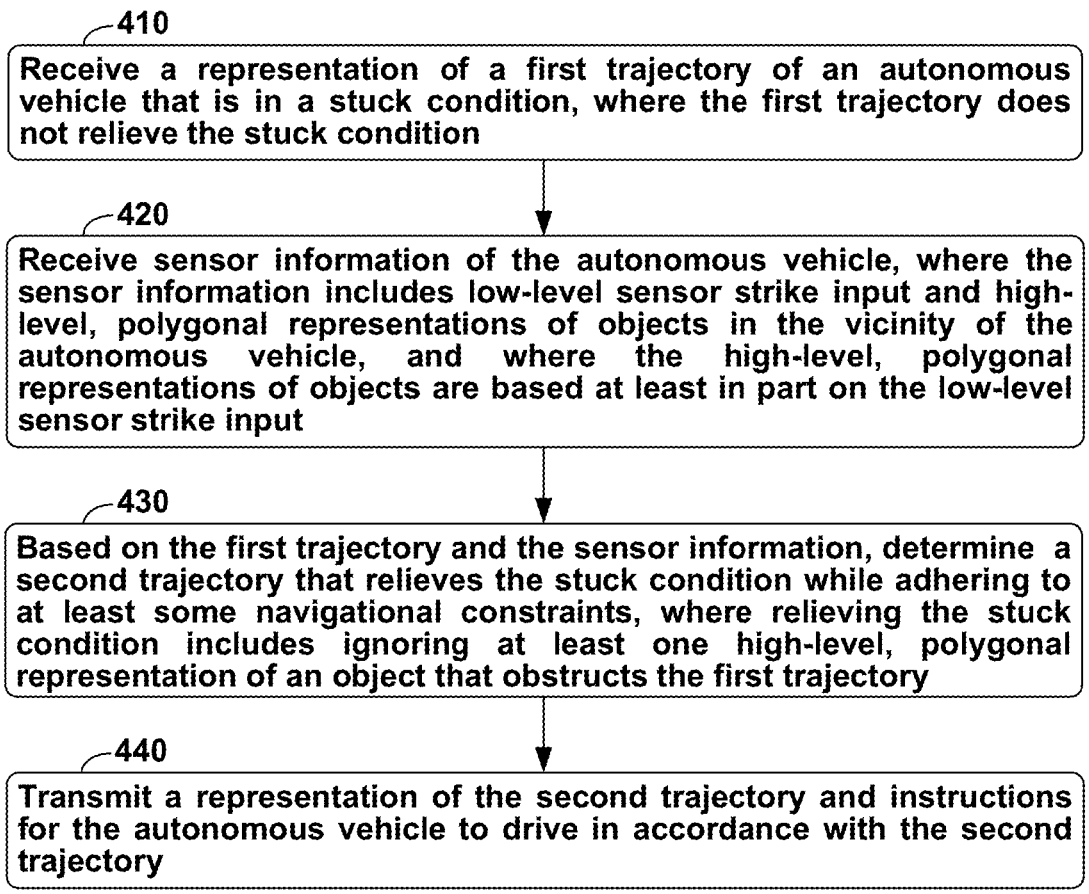
FIG. 4 is a flow chart of still another example method, according to an example embodiment.

FIG. 4 is a flow chart of method 400, according to an example embodiment. Method 400 may be carried out by an assistance center, such as described below in the context of at least FIG. 17.

At block 410, the assistance center may receive a representation of a first trajectory of an autonomous vehicle that is in a stuck condition. The first trajectory might not relieve the stuck condition, such as discussed below in the context of at least FIGS. 8-10 and 15A-15C.

At block 420, the assistance center may receive sensor information of the autonomous vehicle, where the sensor information may include low-level sensor strike input and high-level, polygonal or polyhedral representations of objects in the vicinity of the autonomous vehicle. The high-level, polygonal or polyhedral representations of objects may be based at least in part on the low-level sensor strike input, such as discussed below in the context of at least FIGS. 8-10 and 15A-15C.

At block 430, the assistance center may, based on the first trajectory and the sensor information, determine a second trajectory that relieves the stuck condition while adhering to at least some navigational constraints. These navigational constraints may include, for instance, the autonomous vehicle avoiding collisions, obeying traffic laws, and/or not causing inertial discomfort to its passengers. Relieving the stuck condition may include ignoring at least one high-level, polygonal or polyhedral representation of an object that obstructs the first trajectory, such as discussed below in the context of at least FIGS. 8-10 and 15A-15C. In some embodiments, the first and second trajectories may be identical.

Determining the second trajectory may include determining that the first trajectory does not relieve the stuck condition. After determining that the first trajectory does not relieve the stuck condition, the second trajectory may be determined such that the second trajectory is different from the first trajectory and the second trajectory intersects the first trajectory at two or more points.

Alternatively or additionally, determining the second trajectory may include receiving a request for navigational assistance from the autonomous vehicle, transmitting a request for additional information from the assistance center to the autonomous vehicle, and receiving a proposed trajectory from the autonomous vehicle. The second trajectory may be based on the proposed trajectory, and the proposed trajectory may intersect the first trajectory at two or more points. In some of these embodiments, the second trajectory and the proposed trajectory may be identical, perhaps indicating that the assistance center has accepted the proposed trajectory.

In yet other embodiments, the second trajectory may be determined without human interaction. In still other embodiments, the second trajectory may be determined using a computing device at the assistance center, where the computing device is coupled to a graphical user interface configured to display autonomous vehicle trajectories, and where at least some of the second trajectory may be defined using the graphical user interface.

Method 400 may further include determining that the proposed trajectory relieves the stuck condition. Method 400 may additionally include determining that the proposed trajectory does not relieve the stuck condition, and modifying the proposed trajectory so that the modified proposed trajectory relieves the stuck condition. In these cases, the second trajectory may be the modified proposed trajectory.

At block 440, the assistance center may transmit a representation of the second trajectory and instructions for the autonomous vehicle to drive in accordance with the second trajectory, such as discussed below in the context of at least FIGS. 8-10 and 15A-15C.

In embodiments where the second trajectory is determined using a computing device at the assistance center, method 400 may further include estimating a network data rate between the autonomous vehicle and the computing device and requesting that the autonomous vehicle transmit location and sensor information to the assistance center such that the estimated data rate is not exceeded. This may involve estimating, or otherwise determining a maximum network data rate between the autonomous vehicle and the computing device and controlling the actual data rate between autonomous vehicle and the computing device so that it is no greater than the maximum data rate.

Figure 5:
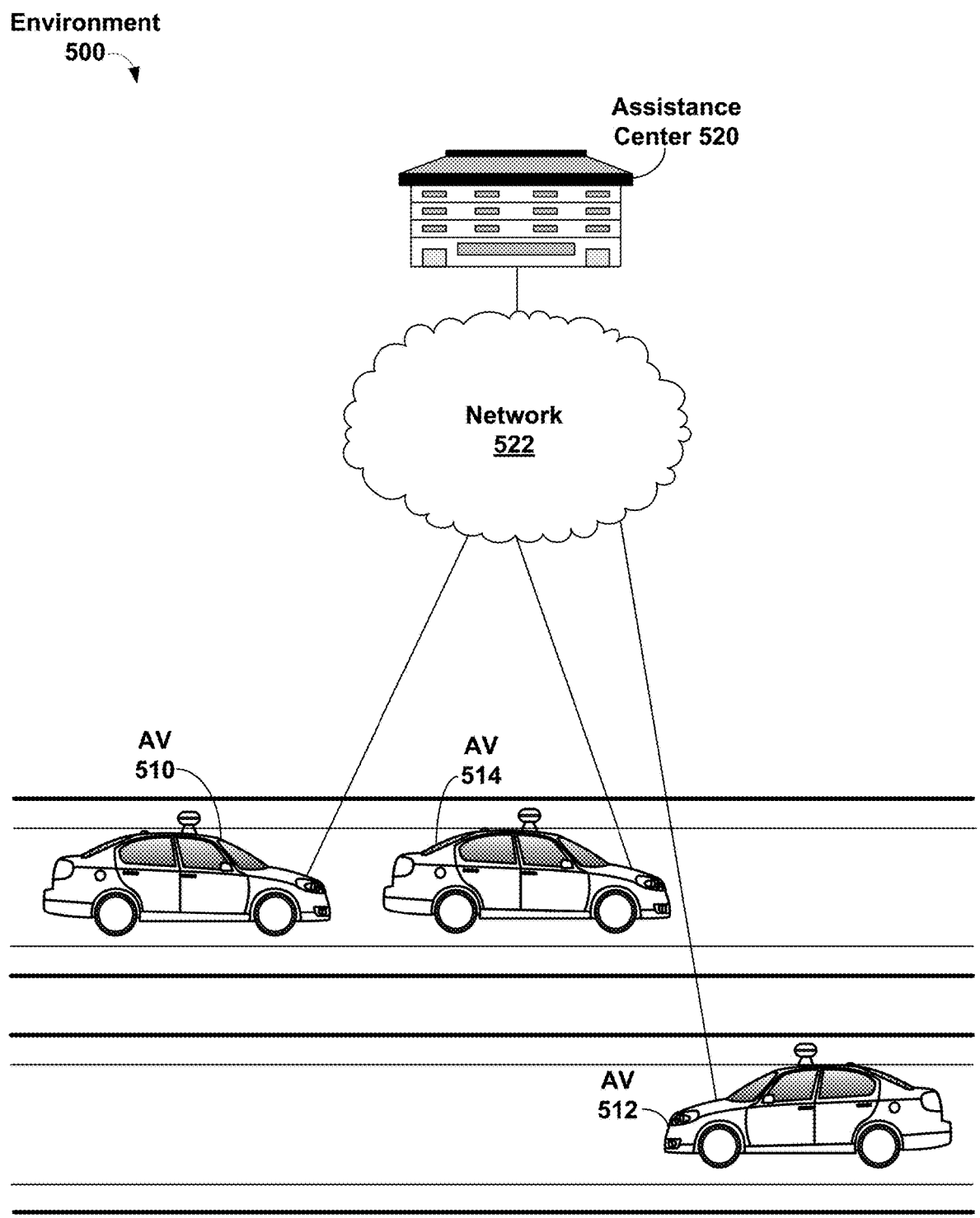
FIG. 5 shows an example autonomous vehicle operating environment, according to an example embodiment.

To that point, FIG. 5 shows an example autonomous vehicle operating environment 500 with a number of autonomous vehicles 510, 512, 514 in communication with assistance center 520 via network 522. In some embodiments, some or all of autonomous vehicles 510, 512, 514 may be capable of communicating with assistance center 520. Network 522 may include one or more networks, such as, but not limited to, one or more wireless wide area networks (WWANs) and/or wireless local area networks (WLANs). Each of autonomous vehicles 510, 512, 514 may be configured with a communication component at least for communicating with assistance center 520 and network 522. Also, assistance center 520 may be configured with a communications component for communicating with one or more of autonomous vehicles 510, 512, 514 and network 522. In some embodiments, some or all functions of assistance center 520 may be performed in an autonomous vehicle, perhaps by a human rider or driver.

Figure 6:
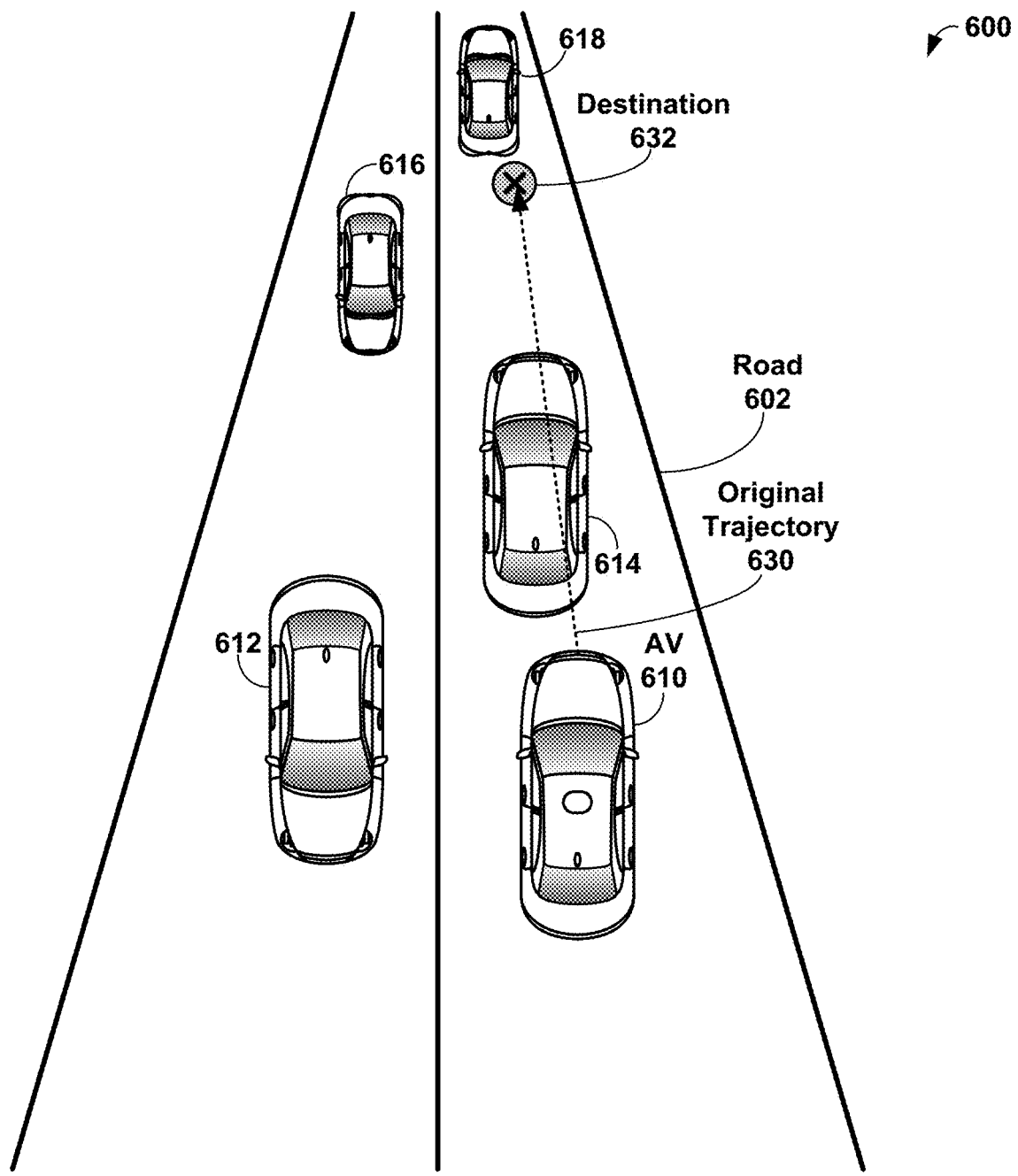
FIG. 6 shows a scenario where an autonomous vehicle is in a stuck condition, according to an example embodiment.

FIG. 6 shows an example scenario 600 where an autonomous vehicle 610 is attempting to drive on road 602 according to original trajectory 630 to destination 632. However, autonomous vehicle 610 is in a stuck condition because original trajectory 630 is blocked by vehicle 614. Thus, navigation according to original trajectory 630 is not possible without adjusting a destination or trajectory of autonomous vehicle 610. Autonomous vehicle 602 may be configured to be able to drive on a left lane of road 602. However, in scenario 600, vehicle 612 blocks that trajectory. In scenario 600, vehicles 612, 614, 616, and 618 may be stopped or moving at a slow speed.

Figure 7:
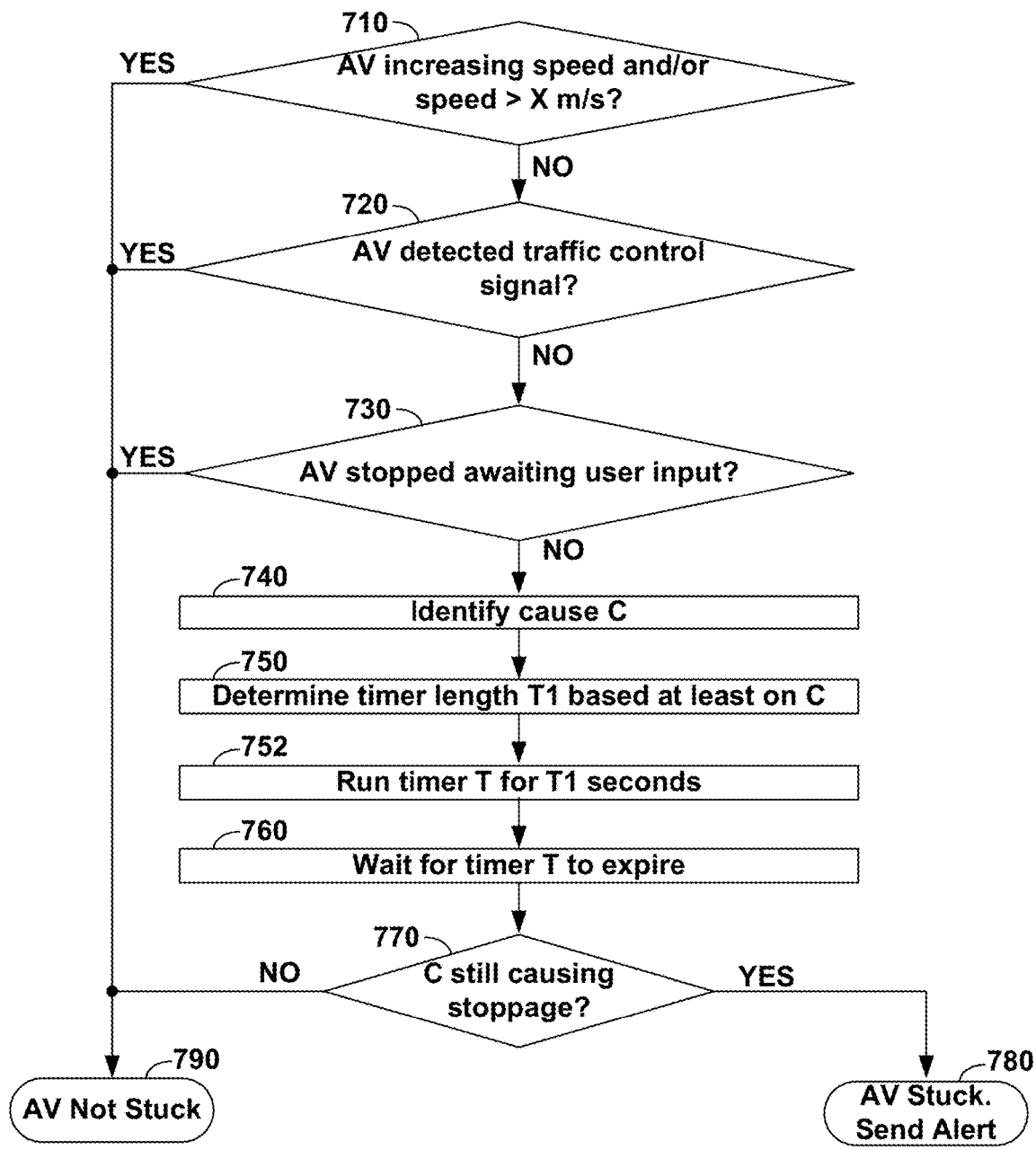
FIG. 7 is a flow chart of an example method for detecting whether an autonomous vehicle is in a stuck condition, according to an example embodiment.

FIG. 7 shows an example method 700 for detecting whether an autonomous vehicle is in a stuck condition. At block 710, the autonomous vehicle may determine if it is either increasing speed and/or if a current speed of the autonomous vehicle is greater than a threshold speed of X meters per second (m/s). In some embodiments, X may be specified in dimensions other than meters per second; e.g., miles per hour, kilometers per hour, or feet per second. If the autonomous vehicle is either increasing speed or if the current speed of the autonomous vehicle is greater than X miles per hour, the autonomous vehicle is not stuck. In some cases, the autonomous vehicle may only determine whether its current speed is greater than the threshold speed.

Otherwise, at block 720, the autonomous vehicle may determine whether it has detected a traffic control signal. The traffic control signal may include a stop sign signal, a stop light signal, a warning sign signal, a warning light signal, yield signal, or some other type of signal that may indicate that the autonomous vehicle should be stopped or operating at a limited speed. If the autonomous vehicle has detected a traffic control signal, the autonomous vehicle is not stuck. Nonetheless, if an autonomous vehicle has been stationary or moving slowly in the presence of a traffic control signal for more than a threshold period of time, the autonomous vehicle may consider itself to be stuck. For instance, the autonomous vehicle may be stopped at a stop sign with its trajectory blocked by another vehicle.

Otherwise, at block 730, the autonomous vehicle may determine whether it is currently stopped awaiting user input. For example, the autonomous vehicle may be stopped while a user specifies a destination for the autonomous vehicle. If the autonomous vehicle is stopped awaiting user input, the autonomous vehicle is not stuck.

Otherwise, at block 740, the autonomous vehicle may identify a cause C for the autonomous vehicle not to be increasing speed and/or for the current speed less than or equal to the threshold speed. The cause C may be a cause based on a pedestrian, a cause based on a vehicle other than the autonomous vehicle, or a cause based on a particular type of object or an unknown object.

At block 750, the autonomous vehicle may set a timer T for T1 seconds, where T1 is based on the cause C. Table 1 below shows an example table of causes and corresponding T1 values.

TABLE 1

| Cause | T1 |
|---|---|
| Vehicle | 8 seconds |
| Pedestrian | 18 seconds |
| Unknown object in trajectory | 12 seconds |

In some embodiments, additional causes to those shown in Table 1 may be identified by the autonomous vehicle, and consequently additional T1 values may be associated with the additional causes. In some cases, T1 values may differ from those specified in Table 1.

Alternatively or additionally, T1 values may be a function of blockage data for a location, where the autonomous vehicle may be stuck due to the nature of the location. For example, T1 values may be determined using a decision tree such as shown in Table 2 below:

TABLE 2

1. Has the autonomous vehicle traversed this location previously?
    a. Yes - have any vehicular obstacles been encountered at this location?
        i. Yes - has a vehicular obstacle been reported within a threshold period oftime; e.g., 15 minutes?
            1. Yes - set T1 = T1 value used for previous obstacle
            2. No - set T1 = 10 seconds
        ii. No - is the blockage in the curbside lane?
            1. Yes - set T1 = 12 seconds.
            2. No - set T1 = 15 seconds.
    b. No - is the blockage in the curbside lane?
        i. Yes - set T1 = 12 seconds.
        ii. No - set T1 = 15 seconds.

In even other embodiments, T1 may be specified based on a combination of features including, but not limited to:

a day of week—e.g., useful for taking into account events like street cleaning days, working days, non-working days/holidays;

property usage information—e.g., is the vehicle at or near building(s) where traffic may have fairly regular patterns, such as a school, a university, a factory, a hospital, a stadium or arena, an office campus, etc.;

a time of day—e.g., schools tend to cause more blockages in the morning and early afternoon, factories and hospitals may have increased traffic at shift changing times, arenas may have increased traffic before and after an event; and/or a number of autonomous vehicles passing through this location per unit time as a measure of congestion.

a number of non-autonomous vehicles passing through this location per unit time as a measure of congestion.

In still other embodiments, T1 may be specified using other units of time than seconds; e.g., tenths of seconds or minutes.

At block 752, timer T may run for T1 seconds; e.g., timer T may be started by the autonomous vehicle. At block 760, the autonomous vehicle may wait for timer T to expire; i.e., wait for at least T1 seconds.

At block 770, the autonomous vehicle may determine whether it is not increasing speed and/or cause C remains as the cause for the autonomous vehicle not to be increasing speed. If cause C does not remain, then the autonomous vehicle is no longer stuck. In some cases, there may be multiple causes for the autonomous vehicle to be stuck. Thus, the autonomous vehicle may examine its environment for another cause, and may attempt to address any further cause in accordance with the techniques described herein.

At block 780, the autonomous vehicle may determine that it is in a stuck condition and send an alert, such as an assistance signal, to indicate that the autonomous vehicle is stuck. In some embodiments, after completing block 780, method 700 may restart; e.g., method 700 may proceed to block 710.

Alternatively or additionally, the autonomous vehicle may process, in parallel, several causes that overlap in time. For instance, if the autonomous vehicle determines that there is another vehicle stopped in front of it and a pedestrian is also crossing the road in front of it, the autonomous vehicle may start two independent timers, one for the other vehicle and one for the pedestrian. If either timer expires, the autonomous vehicle may determine that it is in a stuck condition.

At block 790, the autonomous vehicle may determine that it is not in a stuck condition. In some embodiments, the autonomous vehicle may send an alert to the assistance center. This alert may be a "clear path" signal, to indicate that the autonomous vehicle is not stuck. In some embodiments, after completing the techniques of block 790, method 700 may restart; e.g., method 700 may proceed to block 710.

Figure 8:
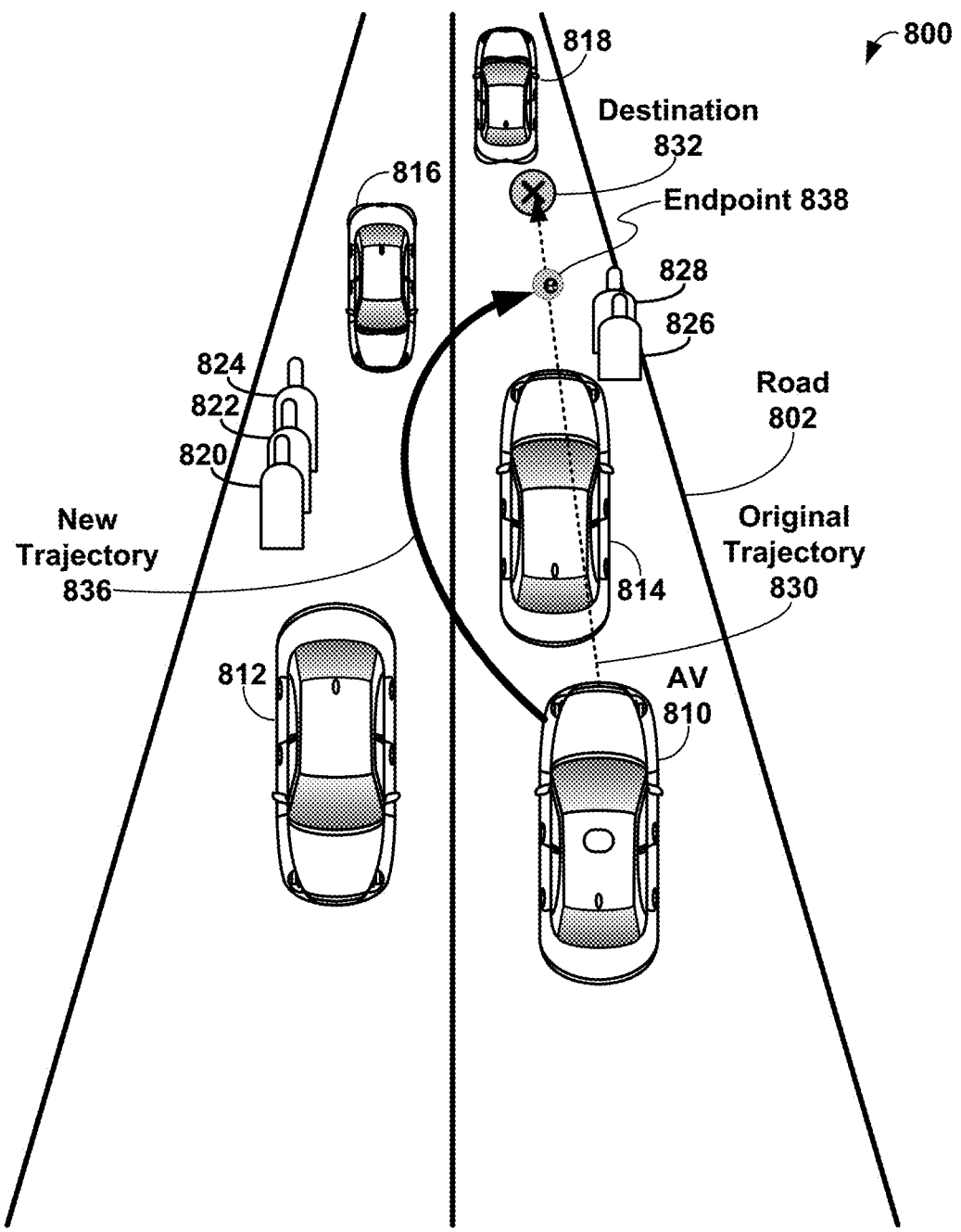
FIG. 8 shows an example scenario where an autonomous vehicle is attempting to follow an original trajectory to destination, according to an example embodiment.

FIG. 8 shows an example scenario 800 where an autonomous vehicle 810 is attempting to drive on road 802 following original trajectory 830 to destination 832. However, autonomous vehicle 810 is in a stuck condition since original trajectory 830 is blocked by vehicle 814. In example scenario 800, vehicles 812, 814, 816, and/or 818 may be stopped or moving slowly (e.g., below a threshold speed).

Upon recognizing that it is in the stuck condition, autonomous vehicle 810 may send (perhaps wirelessly) an assistance signal to an assistance center (not shown in FIG. 8) to relieve the stuck condition. The assistance center may accept the assistance signal and request additional data from autonomous vehicle 810. Alternatively, autonomous vehicle 810 may provide the additional data to the assistance center before receiving such a request.

As mentioned above, heuristics may be applied to reduce the volume of data. One heuristic is to organize the obstacles by distance from the autonomous vehicle and/or to cap the number of obstacles to be the O nearest. Doing so may filter out any obstacles more than D meters away. For example, FIG. 8 shows that vehicle 814 is nearest to autonomous vehicle 810, and then vehicle 812, bottles 820, 822, 824, 826, and 828, and then vehicles 816 and 818. In some embodiments, D may be a function of the speed of autonomous vehicle 810; i.e., the faster the speed of autonomous vehicle 810, the larger the distance that should be considered. Thus, D may increase (or decrease) as the speed of autonomous vehicle 810 increases (or decreases).

Another heuristic may involve sorting obstacles by their distance from the nearest point on the trajectory of autonomous vehicle 810. Computing this set of obstacles may provide a more useful view of upcoming obstacles by prioritizing obstacles in the front of autonomous vehicle 810, but deprioritizing obstacles behind or off to the sides of autonomous vehicle 810. For example, with respect to new trajectory 836, FIG. 8 shows that new trajectory 836 comes closest to vehicle 814, then vehicles 816 and 812, bottles 820, 822, 824, 826, and 828, and then vehicle 818.

Even another heuristic is to prefer expert-friendly types of data for transmission. For example, human experts often may quickly analyze a condition of autonomous vehicle 810 using video data, or if video data is unavailable, using recent still images. Autonomous vehicle 810 may preferentially transmit video data (or still images) over other types of data, as this data is more likely to lead to resolution of the stuck condition than other types of data. In addition to these heuristics to reduce transmission load, throttling (i.e., only transmitting data every X seconds, or when there is a meaningful change) may also be used to further reduce load. Some or all of the herein-described heuristics may be used by autonomous vehicle 810 to provide data to the assistance center.

After receiving this data at the assistance center, an expert may propose new trajectory 836, which begins at a current position of autonomous vehicle 810 and finishes at endpoint 838, where new trajectory 836 joins original trajectory 830. (It is assumed that autonomous vehicle 810 can navigate according to new trajectory 836 without colliding with any objects—thus, FIG. 8, and possibly other figures as well, may not be drawn to scale.)

Upon reaching endpoint 838, autonomous vehicle 810 may switch from new trajectory 836 to original trajectory 830. After receiving and possibly validating new trajectory 836, autonomous vehicle 810 may drive according to new trajectory 836 to endpoint 838 and then according to original trajectory 830 to destination 832. In some embodiments, endpoint 838 might not be on original trajectory 830. Instead, endpoint 838 may allow autonomous vehicle 810 to proceed to a location that may partially relieve the stuck condition. From this location, autonomous vehicle 810 may calculate and/or drive according to one or more additional trajectories that may result in autonomous vehicle 810 eventually rejoining original trajectory 830.

Figure 9:
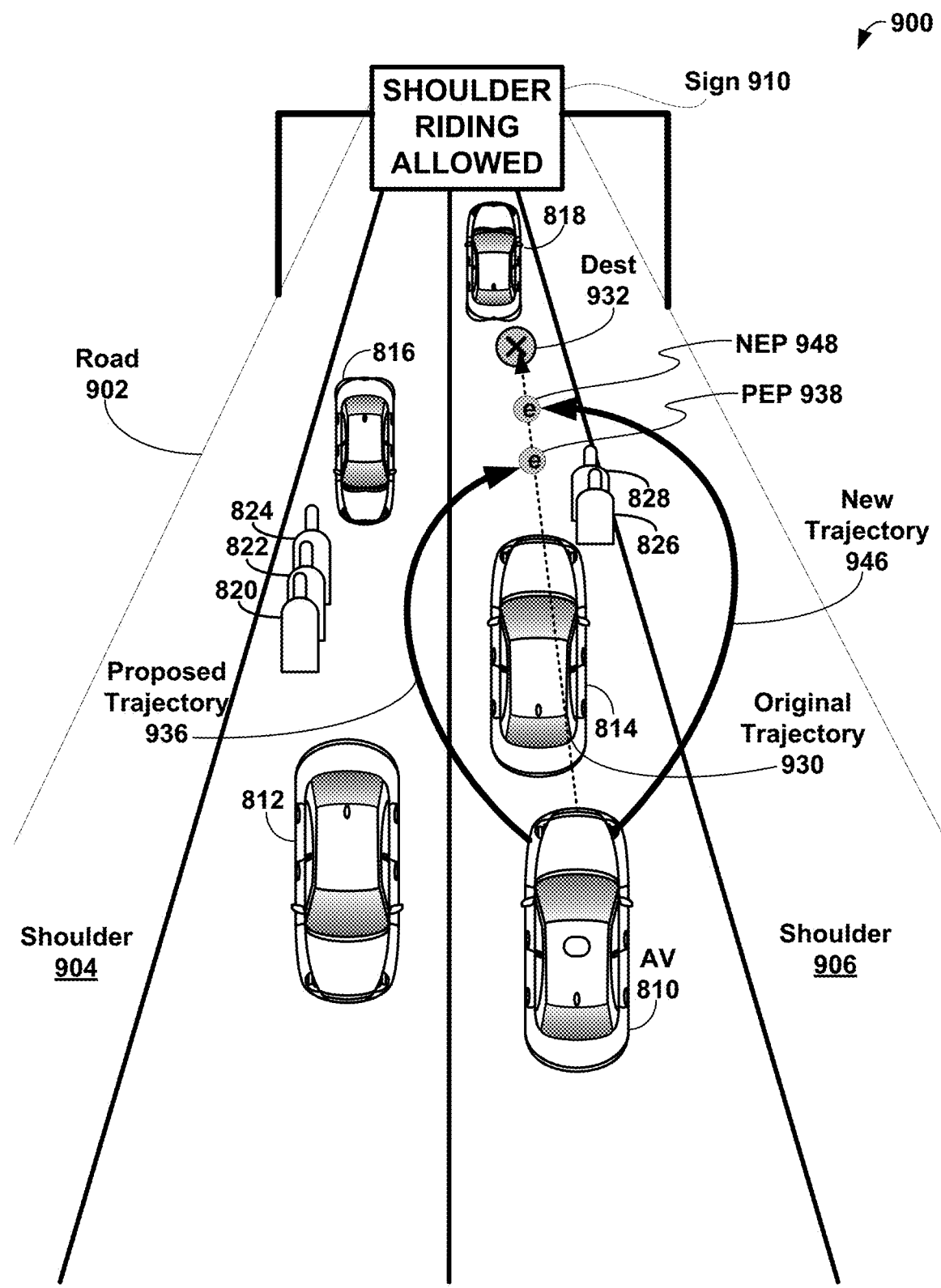
FIG. 9 shows another example scenario where an autonomous vehicle is attempting to follow an original trajectory to destination, according to an example embodiment.

FIG. 9 shows an example scenario 900 where autonomous vehicle 810 is attempting to drive on road 902 following original trajectory 930 to destination 932. Road 902 is similar to road 802 of FIG. 9. However, road 902 has shoulders 904, 906 while road 802 does not have shoulders. Associated with road 902 is sign 910 indicating that "SHOULDER RIDING" is "ALLOWED". In example scenario 900, vehicles 812, 814, 816, and/or 818 may be stopped or moving slowly (e.g., below a threshold speed).

Scenario 900 shows that original trajectory 830 is blocked by vehicle 814. Although autonomous vehicle 810 may be permitted to drive on a left lane of road 902, vehicle 812 blocks that trajectory. Thus, autonomous vehicle 810 may be in a stuck condition.

In scenario 900, upon recognizing that it is in the stuck condition, autonomous vehicle 810 may send an assistance signal to an assistance center (not shown in FIG. 9) to relieve the stuck condition. As part of the assistance signal or in another communication, autonomous vehicle 810 may provide proposed trajectory 936 to the assistance center for consideration. For example, scenario 900 may have occurred after scenario 800 and autonomous vehicle 810 may have stored trajectory 836. Thus, autonomous vehicle 810 may have considered trajectory 836 for use in scenario 900 (possibly with slight modifications as bottles 820, 822, and 824 are slightly farther from vehicle 810), and proposed trajectory 936 based on the slightly-modified trajectory 836. As shown in FIG. 9, proposed trajectory 936 may rejoin original trajectory 930 at proposed endpoint (PEP) 938.

Upon receiving the assistance signal, the assistance center may request and subsequently receive additional information about autonomous vehicle 810 and its environment. In particular, an expert at the assistance center may be provided with image(s) and/or other information about sign 910, and so learn that shoulder riding is allowed. Then, the expert may examine information about shoulder 906 and determine that new trajectory 946 taking shoulder 906 may be used by autonomous vehicle 810 to bypass vehicle 814. As shown in FIG. 9, new trajectory 946 may rejoin original trajectory 930 at new endpoint (NEP) 948. New trajectory 946 has an advantage of generally keeping autonomous vehicle 810 further from obstacles. Therefore, the assistance center may reject proposed trajectory 936 in favor of new trajectory 940.

In providing new trajectory 946 to autonomous vehicle 810, the assistance center may provide a temporary override of any rules inhibiting autonomous vehicle 810 from shoulder riding at least while traveling on new trajectory 946. In scenario 900, autonomous vehicle 810 may receive new trajectory 946 with a temporary override allowing shoulder riding, verify new trajectory 946, and request the assistance center confirm new trajectory 946. Then, the assistance center may confirm new trajectory 946. Upon receiving confirmation of new trajectory 946, autonomous vehicle 810 may take new trajectory 946 to new endpoint 948. At new endpoint 948, autonomous vehicle 810 may rejoin original trajectory 930, and drive to destination 932, in accordance to original trajectory 930.

Figure 10:
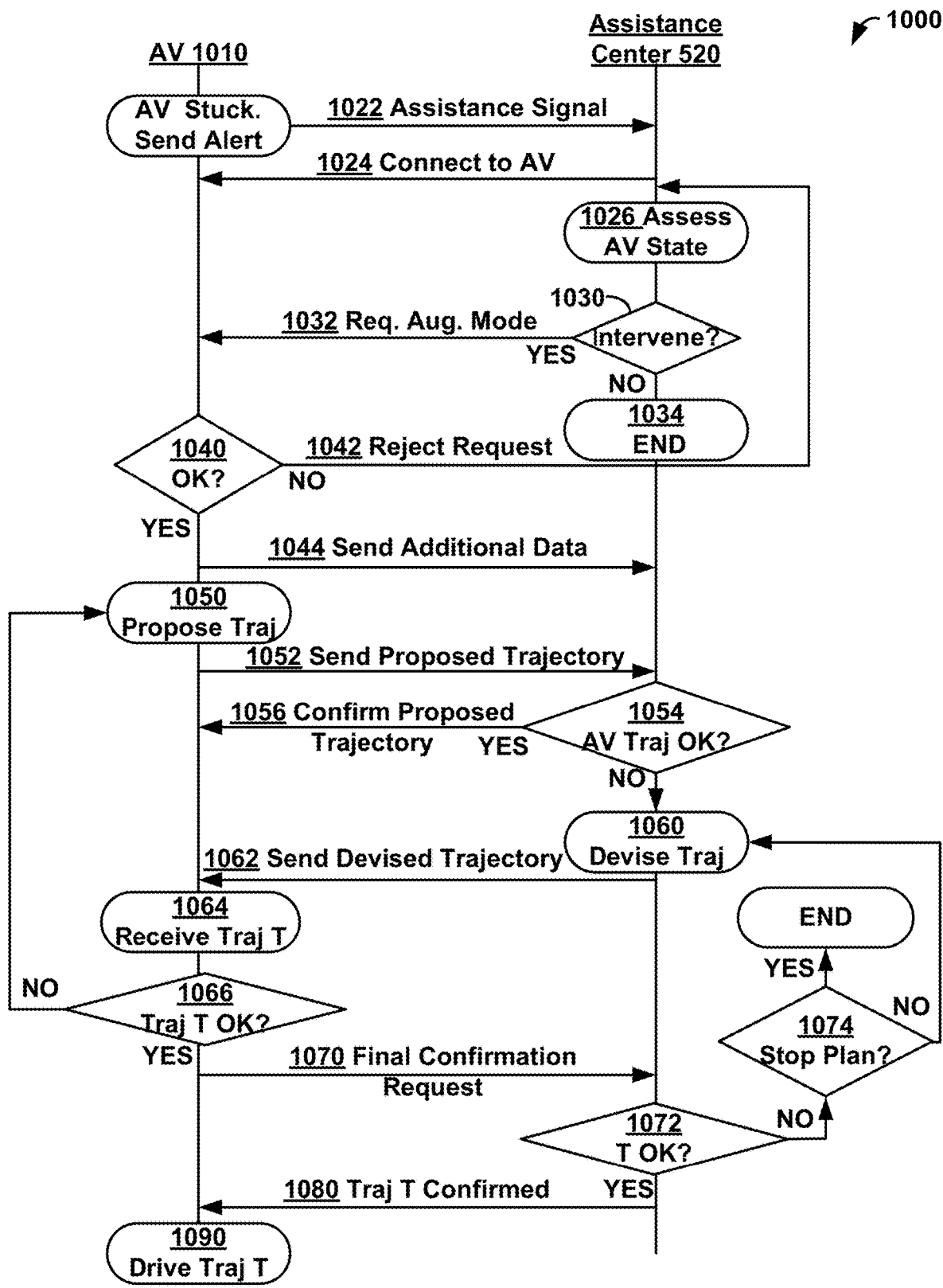
FIG. 10 is a flow chart of an example method where an autonomous vehicle requests assistance from an assistance center to relieve a stuck condition, according to an example embodiment.

FIG. 10 is a flow chart of an example method 1000 that could be used in conjunction with either method 800, method 900, or other methods disclosed herein or defined elsewhere. In example method 1000, autonomous vehicle 1010 may request assistance from assistance center 520 to relieve a stuck condition. For instance, autonomous vehicle 1010 may determine that it is in a stuck condition and send assistance signal 1022 to assistance center 520. After receiving assistance signal 1022, assistance center 520 may send request 1024 to connect to autonomous vehicle 1010.

At block 1026, after connecting to autonomous vehicle 1010, an expert at assistance center 520 may assess a state of autonomous vehicle 1010. The expert may be a human expert, an expert system and/or other computer components, and/or a combination of human expert(s) and computer component(s).

At block 1030, the expert at assistance center 520 may determine whether or not assistance center 520 is to intervene with the navigation of autonomous vehicle 1010. If the expert at assistance center 520 determines to intervene, then assistance center 520 may send request 1032 to enter augmented mode. During augmented mode, autonomous vehicle 1010 may provide additional data to assistance center 520. This additional data may be a combination of location and sensor data from the autonomous vehicle.

At block 1040, autonomous vehicle 1010 may determine whether it should enter augmented mode. For example, autonomous vehicle 1010 may determine whether enough network capacity is available to transmit the necessary data, and/or perform other checks to determine whether or not augmented mode may be entered.

If autonomous vehicle 1010 determines that it should enter augmented mode, then autonomous vehicle 1010 may (periodically or from time to time) send additional data 1044 to assistance center 520. Autonomous vehicle 1010 may apply one or more heuristics to determine additional data 1044 prior to sending. Additional data 1044 may include low-level perceptual data about obstacles, high-level perceptual data about objects, video data, still images, location data and/or audio data. Further, as previously discussed, this additional data may be a subset of all environmental data available to autonomous vehicle 1010, selecting according to, for instance, relative importance.

In some embodiments, at block 1050, autonomous vehicle 1010 may propose a trajectory to relieve the stuck condition. The proposed trajectory may include a path from a current position of autonomous vehicle 1010 to an endpoint where the proposed trajectory joins an original trajectory that autonomous vehicle 1010 was utilizing prior to entering the stuck condition. Alternatively, endpoints that are not on the original trajectory may be used.

Autonomous vehicle 1010 may send proposed trajectory 1052 to assistance center 520. At block 1054, the expert at assistance center 520 may determine whether or not proposed trajectory 1052 relieves the stuck condition while adhering to the navigational constraints of autonomous vehicle 1010. These navigational constraints may include, for instance, the autonomous vehicle avoiding collisions, obeying traffic laws, and/or not causing inertial discomfort to its passengers. If the expert at assistance center 520 determines that this is the case, assistance center 520 may send confirmation 1056 of proposed trajectory 1052 to autonomous vehicle 1010.

If the expert at assistance center 520 determines that this is not the case, the expert at assistance center 520 may devise a trajectory to relieve the stuck condition. For example, the expert may modify an existing plan, modify a solution provided by autonomous vehicle 1010, or generate a new plan in order to devise the trajectory. The devised trajectory may include a path from the current position of autonomous vehicle to an endpoint where the devised trajectory joins the original trajectory of autonomous vehicle 1010, or to some other endpoint. Assistance center 520 may send devised trajectory 1062 to autonomous vehicle 1010.

At block 1064, autonomous vehicle 1010 may receive a representation of trajectory T, which may be either proposed trajectory 1052 or devised trajectory 1062. At block 1066, autonomous vehicle 1010 may determine whether or not it may follow trajectory T to relieve the stuck condition. For example, autonomous vehicle 1010 may determine that autonomous vehicle 1010 may actually execute the trajectory T without violating any rules of operation for autonomous vehicle 1010; e.g., traffic laws. As another example, autonomous vehicle 1010 may recheck locations of objects to verify that trajectory T will likely not lead to a collision.

If autonomous vehicle 1010 determines that it may follow trajectory T, autonomous vehicle 1010 may send final confirmation request 1070 for trajectory T. In some scenarios, autonomous vehicle 1010 may not be able to confirm trajectory T, for instance, due to a lack of sensor data regarding the safety of trajectory T. In these scenarios, autonomous vehicle 1010 may send a message to assistance center 520 rejecting trajectory T, perhaps including one or more reasons for rejecting trajectory T.

At block 1072, the expert at assistance center 520 may verify that trajectory T is valid; e.g., that trajectory T may relieve the stuck condition without violating the navigational constraints of autonomous vehicle 1010. If the expert at assistance center 520 verifies trajectory T, assistance center 520 may send confirmation 1080 of trajectory T to autonomous vehicle 1010. At block 1090, autonomous vehicle 1010 may drive according to trajectory T, to an endpoint of trajectory T, to relieve the stuck condition.

As autonomous vehicle 1010 drives according to trajectory T, autonomous vehicle 1010 may continue to receive new environmental data, such as new laser strike data. In cases where this new environmental data indicates that autonomous vehicle 1010 cannot follow trajectory T, autonomous vehicle 1010 may respond accordingly. For instance, based on the nature of the new environmental data, autonomous vehicle 1010 may avoid new obstacles, or once again determine that it is stuck. In this way, autonomous vehicle 1010 may avoid blindly following a trajectory when doing so puts autonomous vehicle 1010 at risk of colliding with another object.

Figure 11:
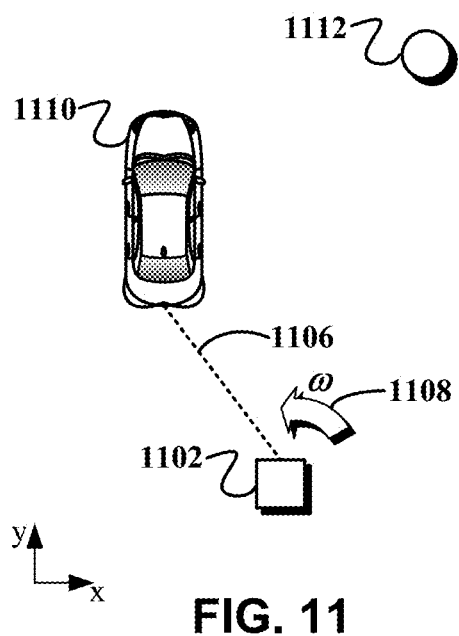
FIG. 11 schematically illustrates a LIDAR unit scanning across an obstacle-filled environmental scene, according to an example embodiment.

Nonetheless, low-level data, such as clusters of laser strikes on surfaces in the vicinity of the autonomous vehicle, may be useful to the assistance center. FIG. 11 schematically illustrates a LIDAR unit 1102, perhaps mounted to, attached to, or part of an autonomous vehicle, scanning across an obstacle-filled environment. The example environment depicted in FIG. 11 includes a car 1110 and a tree 1112.

In operation, LIDAR unit 1102 may rotate according to motion reference arrow 1108 with angular velocity ω. While rotating, LIDAR unit 1102 regularly (e.g., periodically or from time to time) emits laser beams, such as a laser beam 1106. Reflections from the emitted laser beams caused by objects in the environment, such as the car 1110 and the tree 1112, may be received by suitable sensors associated with LIDAR unit 1102. Time-stamping the receipt of the reflected signals allows for associating each reflected signal (if any is received at all) with the most recently emitted laser pulse, and measuring the time delay between emission of the laser pulse and reception of the reflected light.

The time delay provides an estimate of the distance to the reflective feature by scaling according to the speed of light in the intervening atmosphere. Combining the distance information for each reflected signal with the orientation of LIDAR unit 1102 for the respective pulse emission allows for determining a position of the reflective feature in three-dimensions.

In some embodiments, LIDAR unit 1102 may be configured to capture one or more laser point clouds of the environmental scene at predetermined time intervals, such as 100 milliseconds (for a refresh rate of 10 frames per second), 33 milliseconds (for a refresh rate of 30 frames per second), 1 millisecond, 1 second, etc.

In some embodiments, a single laser in LIDAR unit 1102 may have a scanning range of approximately 150 meters distance, a thirty degree vertical ("altitude") field of view, and approximately a thirty degree horizontal ("azimuth") field of view. Additional lasers included in LIDAR unit 1102 may have complementary ranges and fields of view as well so as to provide sufficient coverage of an environmental scene to inform navigational determinations.

Figure 12:
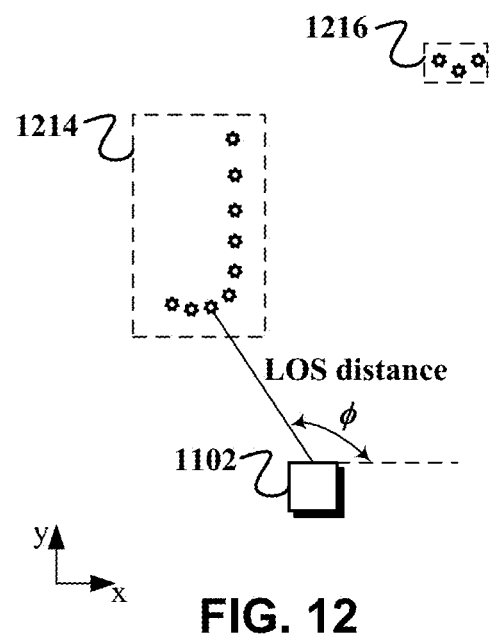
FIG. 12 schematically illustrates an example point cloud corresponding to the obstacle-filled environmental scene of FIG. 11.

FIG. 12 schematically illustrates an example point cloud corresponding to the obstacle-filled environmental scene of FIG. 11. Spatial-point data (represented by stars) are shown from a ground-plane (or aerial) perspective. Even though the individual points are not equally distributed in space throughout the sampled environment, adjacent sampled points are roughly equally spaced angularly with respect to LIDAR unit 1102. In some embodiments, point clouds may have as many as 50,000 laser-indicated points, 80,000 laser-indicated points, 100,000 laser-indicated points, etc. More or fewer laser-indicated points may be used.

Car spatial data 1214 may correspond to measured points on the surface of car 1110 with a line of sight to LIDAR unit 1102. Similarly, tree spatial data 1216 may correspond to measured points on the surface of tree 1112 visible from LIDAR unit 1102. The absence of points between car spatial data 1214 and tree spatial data 1216 indicates an absence of reflective features along the sampled line of sight paths in the plane illustrated.

Each point in the example point cloud illustrated in FIG. 12 may be referenced by an azimuth angle $\phi$ (e.g., the orientation of LIDAR unit 1102 while emitting the pulse corresponding to the point), which is determined by the orientation of a rotating angled mirror (not shown) of LIDAR unit 1102 and a line-of-sight (LOS) distance (e.g., the distance indicated by the time delay between pulse emission and reflected light reception). For emitted pulses that do not receive a reflected signal, the LOS distance may optionally be set to the maximum distance sensitivity of LIDAR unit 1102. The maximum distance sensitivity may be determined according to the maximum time delay the associated optical sensors wait for a return reflected signal following each pulse emission, which may itself be set according to the anticipated signal strength of a reflected signal at a particular distance given ambient lighting conditions, intensity of the emitted pulse, predicted reflectivity of environmental features, etc. In some examples, the maximum distance may be approximately 60 meters, 80 meters, 100 meters, or 150 meters, but other examples of maximum distance are possible for particular configurations of LIDAR unit 1102 and associated optical sensors.

In some embodiments, car spatial data 1214 may be low-level "strike input" data. This low-level data may be considered alone and/or in combination with additional sensor-indicated information, memory-based pattern-matching point clouds, and/or baseline maps of the environment to generate high-level, polygonal or polyhedral representations of objects in the environment. The high-level, polygonal or polyhedral representations may be generated by categorizing or identifying car spatial data 1214 as corresponding to car 1110 and generating a polygonal or polyhedral representation of car 1110. Similarly, tree spatial data 1216 may identified as corresponding to tree 1112 in accordance with a suitable object-detection technique and so lead to generation of a polygonal or polyhedral representation of tree 1112.

This processing may make use of an object detector. An object detector may be any configuration of software and/or hardware configured to perceive features in the environmental scene by categorizing object(s), identifying object(s), and/or generating polygonal or polyhedral representation(s) of categorized/identified objects based on the low-level laser point clouds captured by LIDAR unit 1102 and/or based on one or more of the sensors in the sensor system 1604. As a laser point cloud is captured via LIDAR unit 1102, data indicative of the captured point cloud is communicated to the object detector, which analyzes the data to determine whether there is an object present in the laser point cloud. Objects indicated by the point cloud may be, for example, a vehicle (e.g., car 1110) an obstacle (e.g., tree 1112), a pedestrian, a road sign, a traffic light, a traffic cone, etc.

To determine whether an object is present in a laser point cloud image, the object-detector software and/or module may associate arrangements of laser-indicated points with patterns matching objects, environmental features, and/or categories of objects or features. The object detector may be pre-loaded (or dynamically instructed) to associate arrangements according to one or more parameters corresponding to physical objects/features in the environment surrounding vehicle 1110. For example, the object detector may be pre-loaded with information indicating a typical height of a pedestrian, a length of a typical automobile, confidence thresholds for classifying suspected objects, etc.

If an object (or objects) is present in the point cloud, the object detector may generate a polygonal or polyhedral representation corresponding to the object. For example, when the object detector identifies an object in a point cloud, the object detector may define a bounding box encompassing the object. The bounding box may correspond to a predicted exterior surface of the point cloud indicated object. Of course, the bounding "box" may generally take the form of a multi-sided polygon or polyhedron defining the predicted outer boundaries of the object.

For each captured point cloud, positions of perceived objects and their corresponding boundary definitions are associated with a frame number or frame time. Thus, similarly shaped objects appearing in the same or roughly similar locations in successive scans of the scene may be associated with one another to track objects in time. Perceived objects appearing in multiple point cloud frames (e.g., complete scans of the scanning zone), may be considered to be the same object, and may be either stationary or in motion relative to vehicle 1110. Each perceived object may be associated, for each frame on which the perceived object appears, with a distinct bounding shape defining the dimensional extent of the perceived object.

Further, as noted above, each spatial point may be associated with a respective laser from a set of lasers and a respective timestamp. That is, in an embodiment where LIDAR unit 1102 includes multiple lasers, each respective spatial point may be associated with the particular laser that detected the respective spatial point. Additionally, each respective spatial point may be associated with a respective timestamp (e.g., a time at which the particular laser was emitted or received). In this way, the received spatial points may be organized, identified, or otherwise ordered on a spatial (laser identification) and/or temporal (timestamp) basis. Such an ordering may assist or improve an analysis of the spatial point data by allowing for organizing the spatial point data into a meaningful order. Some or all of the laser strike data, point cloud data, and/or object-related bounding box data may be stored by the autonomous vehicle.

Figure 13:
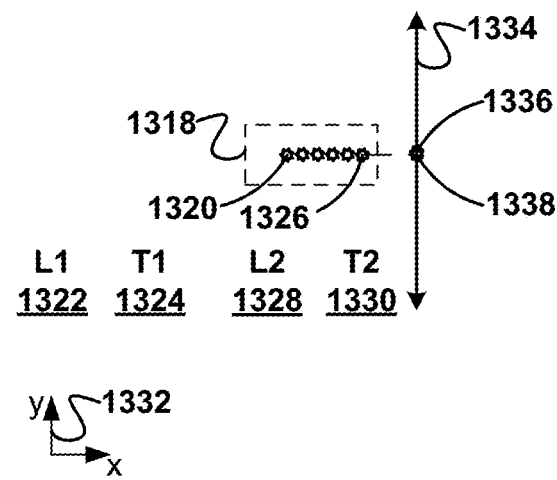
FIG. 13 schematically illustrates spatial point data indicative of a surface of a target vehicle that is stationary relative to a LIDAR unit, according to an example embodiment.

FIG. 13 schematically illustrates spatial point data indicative of a surface of a target vehicle that is stationary relative to a LIDAR unit, according to an example embodiment. The LIDAR unit may be mounted on an autonomous vehicle or otherwise integrated or associated with an autonomous vehicle. In this example, a target surface 1318 is identified from a set of spatial points indicative of locations of reflective surfaces received from LIDAR unit 1102 by an object-detection technique mentioned herein and/or any other known or later developed. In some embodiments, the set of spatial points is received from a single sweep of LIDAR unit 1102. Target surface 1318 may be a front or rear surface of a target vehicle, such as vehicle 1110.

In this example, a first point 1320 and a second point 1326 are also identified by an object-detection technique mentioned herein and/or any other known or later developed. The first point 1320 is indicative of a first location 1322 on target surface 1318 obtained from LIDAR unit 1102 at a first time 1324, and the second point 1326 is indicative of a second location 1328 on target surface 1318 obtained from LIDAR unit 1102 at a second time 1330. Other points illustrated in FIG. 13 may be indicative of other locations on target surface 1318 obtained from LIDAR unit 1102 at other times. With this arrangement, a speed of target surface 1318 relative to LIDAR unit 1102 may be estimated based on the first location 1322, the first time 1324, the second location 1328, and the second time 1330.

In this example, the estimate of a relative speed of target surface 1318 may be determined based on an offset between first location 1322 and second location 1328 divided by a time difference between the second time 1330 and the first time 1324.

As illustrated in FIG. 13, a coordinate frame 1332 includes a longitudinal axis 1334. In this example, target surface 1318 is perpendicular to the longitudinal axis 1334. A projected first point 1336 may be determined by projecting the first point 1320 onto the longitudinal axis 1334, and a second point 1338 may be determined by projecting the second point 1326 onto the longitudinal axis 1334. With this arrangement, the offset between the first location 1322 and the second location 1328 is determined as a distance between the projected first point 1336 and the projected second point 1338.

In this example, the offset is zero because the projected first point 1336 and the projected second point 1338 are each at the same location on the longitudinal axis 1334. Accordingly, the estimate of the speed of target surface 1318 in this example is zero.

In some embodiments, the coordinate frame 1332 may include a fixed coordinate frame in an environment of LIDAR unit 1102 based on data from an inertial measurement unit (IMU) associated with a vehicle. However, in some embodiments, the defining of a coordinate frame may also be based at least in part on data from other sensors associated with the vehicle. For instance, the defining of a coordinate frame may also be based at least in part on data from a GPS associated with the vehicle. Doing so may improve estimates of the speed and trajectory of target surface 1318. Other examples are also possible.

In some embodiments, the longitudinal axis 1334 may be defined based on a direction of motion of LIDAR unit 1102 and/or a direction of motion of target surface 1318. In some examples, the direction of motion of LIDAR unit 1102 is known. However, in other examples, the direction of motion of LIDAR unit 1102 may be identified based on any technique mentioned herein and/or any other known or later developed. For instance, the direction of motion of LIDAR unit 1102 may be identified based on a direction of a path that LIDAR unit 1102 is traveling, such as a roadway or a traffic lane. In some examples, the direction of motion of target surface 1318 is known. However, in other examples, the direction of motion of target surface 1318 may be identified based on any technique mentioned herein and/or any other known or later developed.

Figure 14:
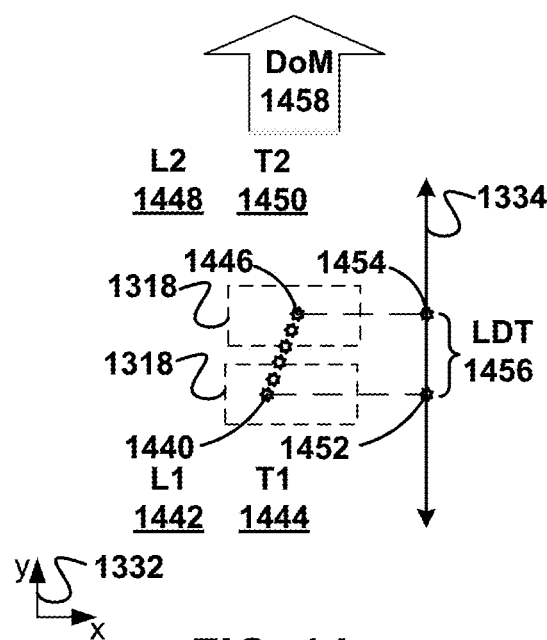
FIG. 14 schematically illustrates spatial point data indicative of a surface of a target vehicle that is moving relative to a LIDAR unit, according to an example embodiment.

FIG. 14 schematically illustrates spatial point data indicative of a surface of a target vehicle that is moving relative to the LIDAR unit, according to an example embodiment. In this example, a first point 1440 and a second point 1446 on target surface 1318 are also identified by an object-detection technique discussed herein and/or any others known or later developed. First point 1440 is indicative of a first location 1442 on target surface 1318 obtained from LIDAR unit 1102 at a first time 1444, and second point 1446 is indicative of a second location 1448 on target surface 1318 obtained from LIDAR unit 1102 at a second time 1450. Other points illustrated in FIG. 14 may be indicative of other locations on target surface 1318 obtained from LIDAR unit 1102 at other times.

In this example, target surface 1318 has a known direction of motion 1458. Further, an estimate of a speed of target surface 1318 may be determined based on an offset between first location 1442 and second location 1448 divided by a time difference between second time 1450 and first time 1444.

A projected first point 1452 may be determined by projecting first point 1440 onto longitudinal axis 1334, and a projected second point 1454 may be determined by projecting second point 1446 onto longitudinal axis 1334. With this arrangement, the offset between first location 1442 and second location 1448 may be determined as a distance between projected first point 1452 and projected second point 1454. The offset is greater than zero because projected first point 1452 and projected second point 1454 are separated by a non-zero distance on longitudinal axis 1334. Accordingly, the estimate of the speed of target surface 1318 is greater than zero. As illustrated in FIG. 14, the distance may represent a longitudinal distance traveled 1456 by target surface 1318.

Figure 15A:
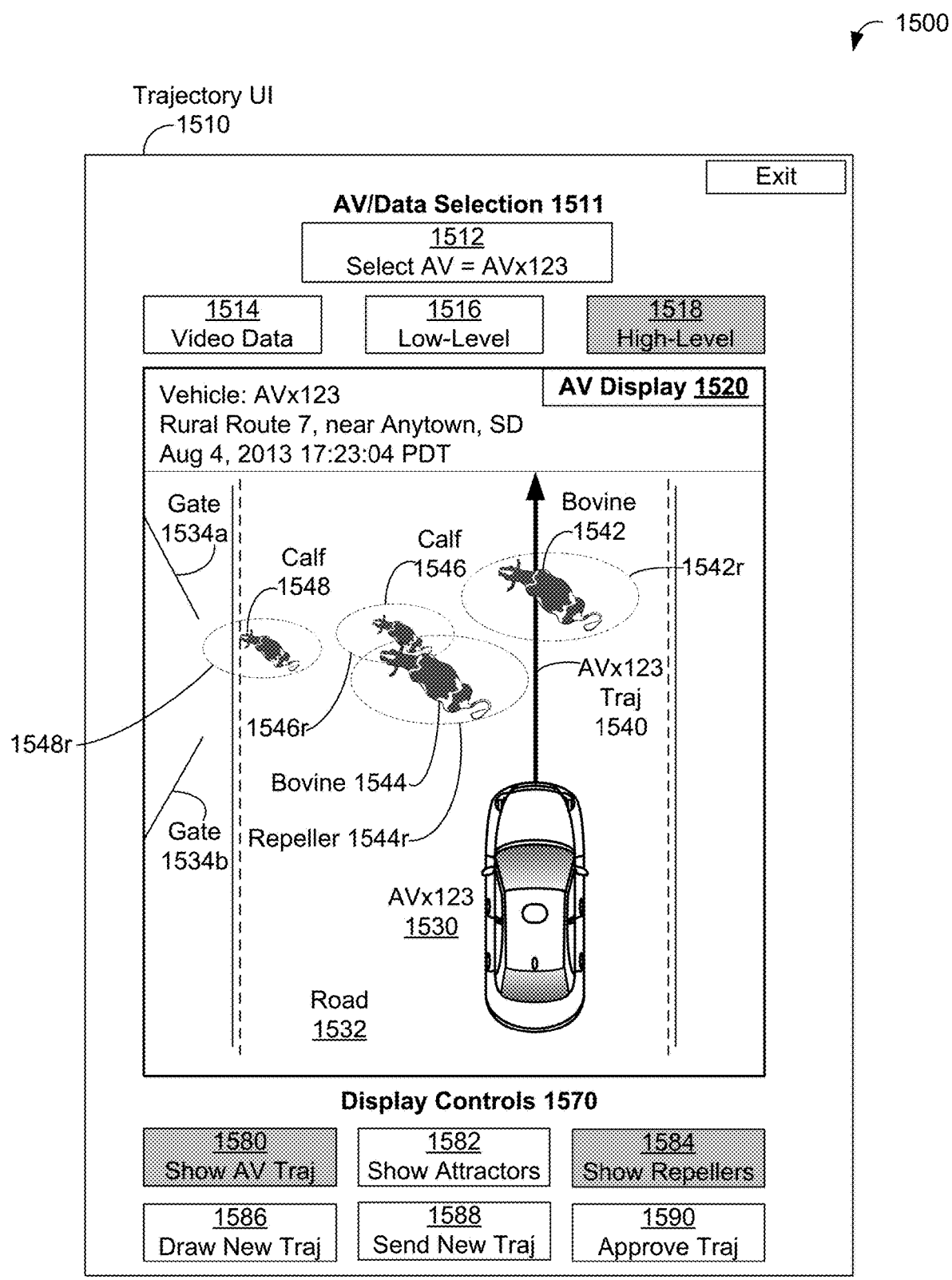
FIGS. 15A, 15B, and 15C show a scenario for using a trajectory interface to relieve a stuck condition of an autonomous vehicle, according to example embodiments.
Figure 15B:
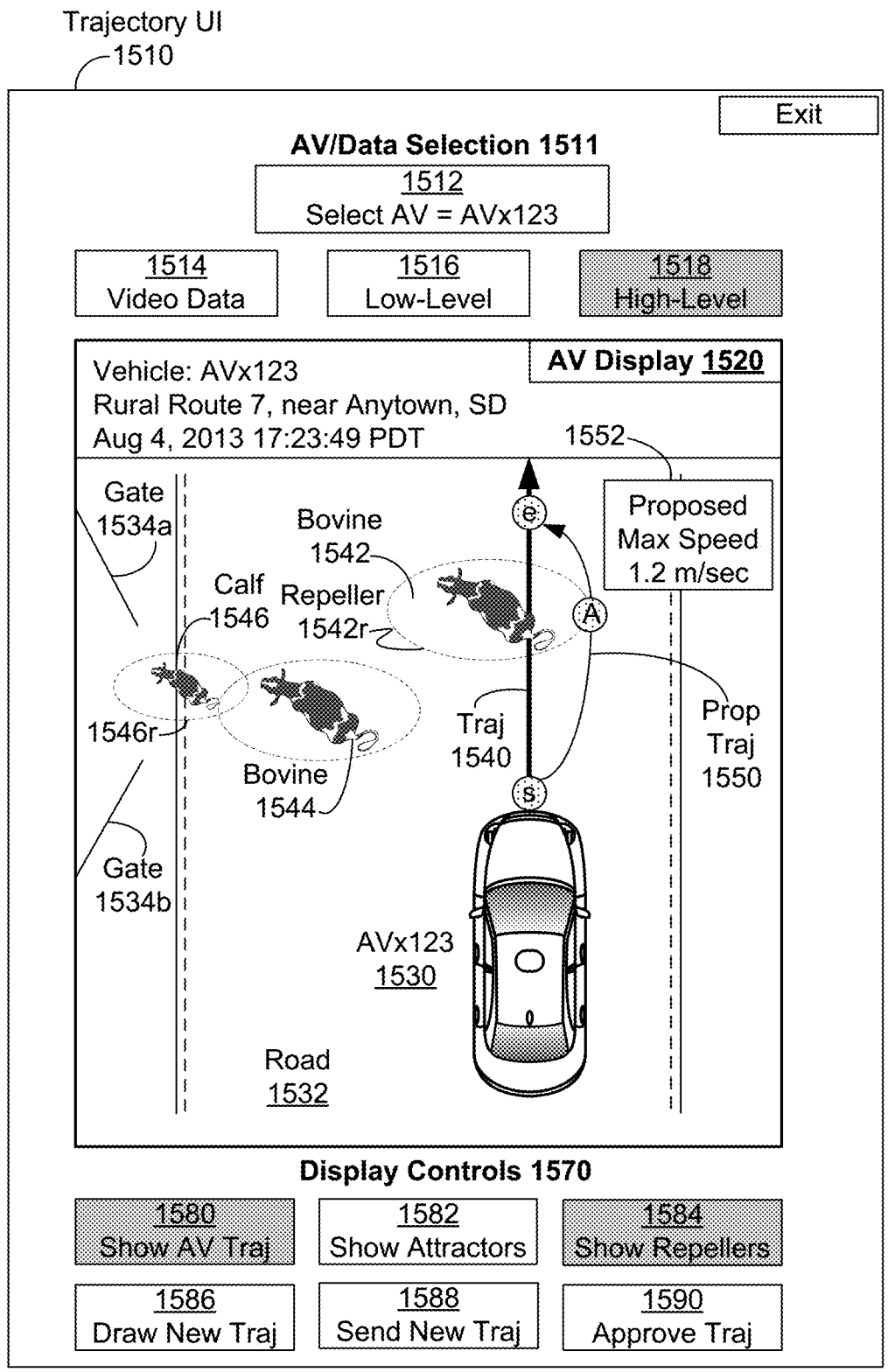
Figure 15C:
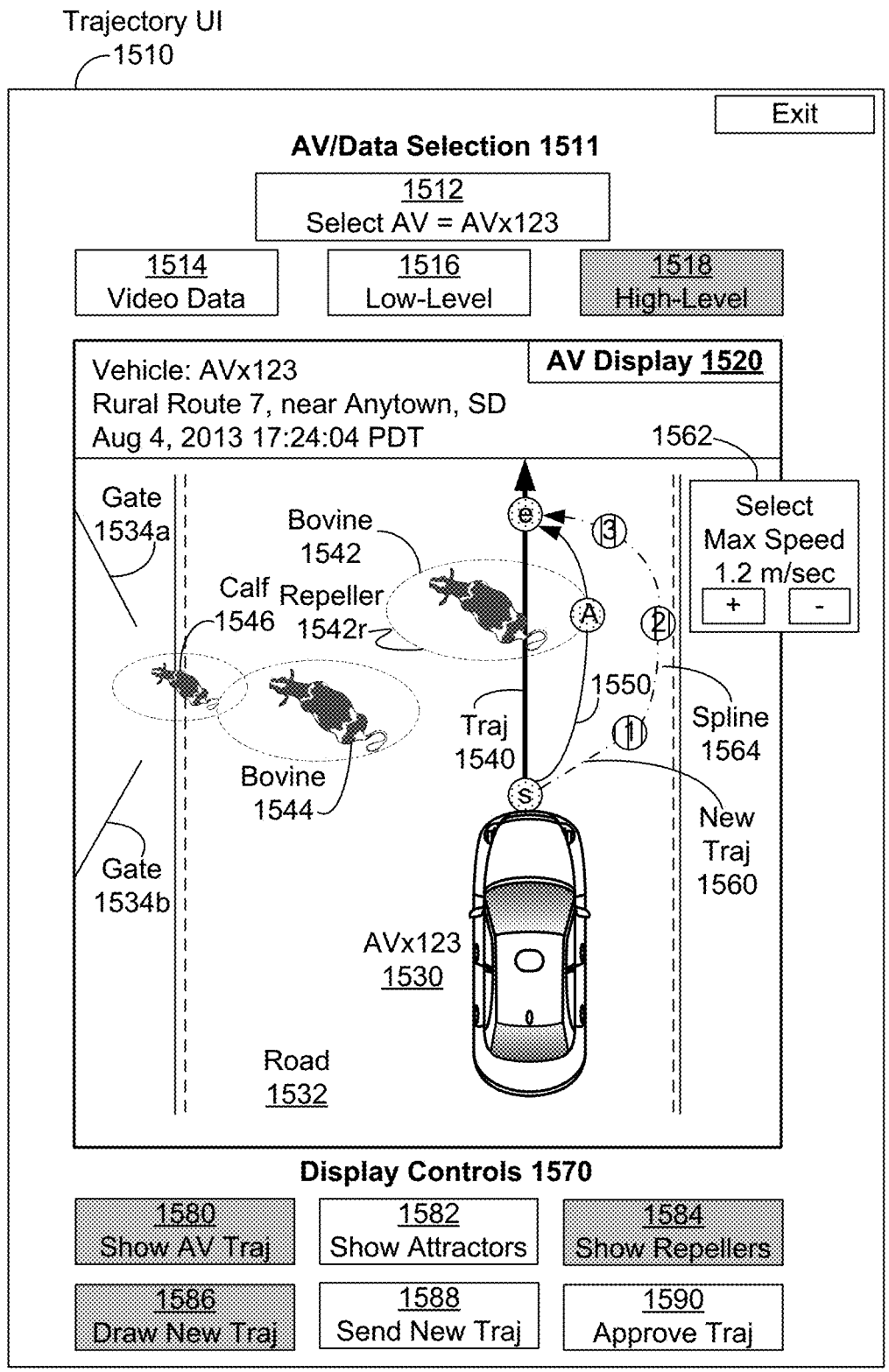

FIGS. 15A, 15B, and 15C show scenario 1500 using trajectory user interface (UI) 1510 to relieve a stuck condition of an autonomous vehicle. In some embodiments, trajectory UI 1510 may be provided using a graphical user interface (GUI) of a computing device. For example, trajectory UI 1510 may utilize one or more windows, buttons, dialogs, and other components of the GUI. In scenario 1500, trajectory UI 1510 may be utilized at an assistance center, such as assistance center 520, and may be configured to communicate with one or more autonomous vehicles and with one or more experts. The expert(s) may be human experts and/or computing components, such as but not limited to expert systems. Alternatively or additionally, trajectory UI 1510 may be utilized in an autonomous vehicle, perhaps by a passenger of the autonomous vehicle.

FIG. 15A shows a display of trajectory UI 1510 including an autonomous vehicle/data selection section 1511, autonomous vehicle display 1520, and a display control section 1570. In some embodiments, more, less, or different sections and/or displays may be provided using trajectory UI 1510.

Autonomous vehicle/data selection section 1511 includes autonomous vehicle selection button 1512, video data button 1514, low-level data button 1516, and high-level data button 1518. In some embodiments, more, less, or different buttons may be provided in the autonomous vehicle/data selection section of trajectory UI 1510.

In FIGS. 15A-15C, buttons that are selected are shown with a gray background, while buttons that are not selected are shown with a white background. For example, in scenario 1500, high-level data button 1518 is selected, while autonomous vehicle selection button 1512, video data button 1514 and low-level data button 1516 are not selected.

Upon selection, autonomous vehicle selection button 1512 may instruct trajectory UI 1510 to display a dialog or similar graphical component (not shown in the figures) listing autonomous vehicles seeking assistance. An expert may use the dialog to select an autonomous vehicle to assist, and upon selection, begin communication with the selected autonomous vehicle. Once an autonomous vehicle is selected for assistance, trajectory UI 1510 may display an identifier and/or other information for the selected autonomous vehicle. FIG. 15A shows an identifier "AVx123" for an autonomous vehicle selected for assistance during scenario 1500. Then, when the expert has finished assisting the selected autonomous vehicle, the expert may use autonomous vehicle selection button 1512 to select another autonomous vehicle to be assisted, assuming that another autonomous vehicle has requested assistance.

Video data button 1514, when selected, may be used to generate a request to a selected autonomous vehicle to provide video data. The video data may include sequences of images configured for display in succession at a constant rate and/or still images. Once video data is available, trajectory UI 1510 may display the video data using autonomous vehicle display 1520 and/or using another display or window. In some embodiments, if more than one of buttons 1514, 1516, and 1518 are selected, separate displays or windows may be provided by trajectory UI 1510 for each type of data; e.g., video data associated with button 1514, low-level data associated with button 1516, and high-level data associated with button 1514. Low-level data and high-level data are discussed below in more detail at least in the context of FIG. 16. Alternatively or additionally, some or all of video data, low-level data, and high-level data may be combined into one display.

Low-level data button 1516, when selected, may generate a request to a selected autonomous vehicle to provide low-level data. When the low-level data is available, the low-level data may be displayed using autonomous vehicle display 1520 and/or using another display or window. High-level data button 1518, when selected, may generate a request to a selected autonomous vehicle to provide high-level data. When the high-level data is available, the high-level data may be displayed using autonomous vehicle display 1520 and/or using another display or window.

In some embodiments, the autonomous vehicle selects data for transmission to the assistance center. In these embodiments, selection of one of buttons 1514, 1516, or 1518 may not lead to a request for data; rather, trajectory UI 1510 may indicate that such data is available by changing display of buttons 1514, 1516, and/or 1518 to indicate data availability. Then, if the expert selects a button associated with available data, the data may be displayed using autonomous vehicle window 1520 or another window. And, upon selection of a button not associated with available data, an error message/dialog may be generated indicating the unavailability of the selected data. In particular embodiments, even if the autonomous vehicle selects data for transmission, the autonomous vehicle may honor a request for data, and in these embodiments, upon selection of a button not associated with available data, a request for the data may be sent to the autonomous vehicle.

In scenario 1500, high-level data is provided by the autonomous vehicle and is selected, as indicated by the gray background of button 1518 in FIG. 15A. As such, autonomous vehicle display 1520 shows high-level data, represented as graphical objects, representing autonomous vehicle AVx123 1530, road 1532, gates 1534a, 1534b, bovines 1542, 1544, and calves 1546 and 1548. In scenario 1500, bovines 1542, 1544 and calves 1546, 1548 are travelling to the left, crossing road 1532 to enter a field (not shown) accessible via an opening between gate 1534a and gate 1534b. Autonomous vehicle AVx123 1530 has an original trajectory 1540 that would impact bovine 1542 at or shortly after time "17:23:04 PDT".

As such, autonomous vehicle AVx123 1530 is in a stuck condition. In scenario 1500, prior to requesting assistance, autonomous vehicle AVx123 1530 may have waited for a timer to expire upon determining this stuck condition, such as discussed in detail in the context of FIG. 7, based on a cause that bovines 1542, 1544 and calves 1546, 1548 are obstructing trajectory 1540. At 17:23:04 PDT, as shown in FIG. 15A, only bovine 1542 remains obstructing trajectory 1540.

Display controls section 1570 of trajectory UI 1510 is shown in FIG. 15A with six buttons: show autonomous vehicle trajectory button 1580, show attractors button 1582, show repellers button 1584, draw new trajectory button 1586, send new trajectory button 1588, and approve trajectory button 1590. FIG. 15A shows that buttons 1580 and 1584 are selected and buttons 1582, 1586, 1588, and 1590 are not selected. In some embodiments, more, less, or different buttons are provided in the display controls section of trajectory UI 1510.

Autonomous vehicle trajectory button 1580, when selected, instructs autonomous vehicle display 1520 to display a trajectory for the selected autonomous vehicle. As autonomous vehicle trajectory button 1580 is selected, trajectory 1540 for selected autonomous vehicle AVx123 is displayed on display 1520. FIG. 15A shows trajectory 1540 as an arrow from a display of high-level object 1530 representing AVx123 going toward the top of the figure. In some embodiments, if autonomous vehicle trajectory button 1580 were selected again, autonomous vehicle trajectory button 1580 may act as a toggle and display 1520 would no longer display trajectory 1540.

Show attractors button 1582 may, when selected, instruct autonomous vehicle display 1520 to show "attractors." Similarly, show repellers button 1584 may, when selected, instruct autonomous vehicle display 1520 to show "repellers." In some embodiments, providing trajectories to an autonomous vehicle may be modeled as an energy minimization problem defined by a series of attractors and repellers.

These attractors and repellers may be placed by an expert, or may be automatically determined by autonomous vehicle AVx123.

One or more attractors, or positive potentials, may exist or may be inserted along a center of a lane of road 1532. Attractors may be placed in other positions that are desirable for autonomous vehicle travel. Attractors are not explicitly shown in FIGS. 15A, 15B, and 15C.

Repellers, or negative potentials, may exist or may be inserted at undesirable positions, such at the edges of lanes and surrounding obstacles that may partially or completely block a trajectory of an autonomous vehicle. In FIGS. 15A-15C, repellers are shown in autonomous vehicle display 1520 as dashed lines. For instance, repellers 1542r, 1544r, 1546r, 1548r exist around bovines/calves 1542, 1544, 1546, 1548, respectively. Repellers are also shown near the edges of road 1532.

In some embodiments, an expert may specify an endpoint and a series of attractors and repellers with controls for varying the strength and radius of effect of these potentials. These data may be provided to autonomous vehicle AVx123 to define a new trajectory that tries to take attractive paths and avoid repelled paths.

Draw new trajectory button 1586, when selected, allows the expert to enter an augmented trajectory for autonomous vehicle AVx123. Send new trajectory button 1588, when selected, allows the expert to send the augmented trajectory for autonomous vehicle AVx123. Approve trajectory button 1590, when selected, allows the expert to send a message to the autonomous vehicle that approves a trajectory sent by autonomous vehicle AVx123. Once a trajectory is approved, autonomous vehicle AVx123 may drive along the approved trajectory to relieve a stuck condition, or for another purpose.

In some embodiments, an augmented or new trajectory for an autonomous vehicle may be specified based on two points: a point of departure from an existing trajectory and an endpoint. The endpoint may be a point of return to the existing trajectory or a point that is not part of the existing trajectory. For instance, the endpoint might specify a location to which the autonomous vehicle can drive that at least partially relieves the stuck condition. In particular embodiments, the point of departure may be inferred as a current position of the autonomous vehicle, and so only the point of return may be explicitly specified.

The trajectory may also include collection of waypoints to navigate between (i) the point of departure or a current position, and (ii) the endpoint of the trajectory. The collection of waypoints may be specified using a spline, which is a piecewise-smooth function connected by the waypoints. Upon reaching the endpoint, the autonomous vehicle may continue with the original trajectory. In some embodiments, some or all of the collection of waypoints may be specified other than by a spline; e.g., using piecewise linear functions, other piecewise-smooth functions, polynomials, lists of waypoints, etc.

Turning to FIG. 15B, scenario 1500 continues at time "17:23:49 PDT" where autonomous vehicle AVx123 has provided a proposed trajectory 1550 and proposed maximum speed 1552 to relieve the stuck condition. FIG. 15B shows that autonomous vehicle display 1520 portrays proposed trajectory 1550 as a relatively thin arrow from a starting point or point of departure, shown as the letter "s" in a circle, through a waypoint shown as the letter "A" in a circle, to an endpoint or point of return, shown as the letter "e" in a circle. In some embodiments, an autonomous vehicle may propose a maximum speed to travel on a proposed trajectory. FIG. 15B shows the proposed maximum speed 1552 for trajectory 1550 of 1.2 meters/second. In some embodiments, an autonomous vehicle may propose a trajectory to relieve a stuck condition (or for some other purpose) without proposing a related speed, such as a maximum, minimum or average speed. Alternatively or additionally, the autonomous vehicle may also or instead propose minimum and/or average speeds.

Upon reviewing proposed trajectory 1550, the expert may determine that proposed trajectory 1550 may come too close to bovine 1542. Then, the expert may specify a different trajectory than proposed trajectory 1550. In scenario 1500, as shown in FIG. 15B, the expert may press draw new trajectory button 1586 to specify a trajectory.

FIG. 15C shows that scenario 1500 continues at time "17:24:04 PDT" with draw new trajectory button 1586 selected. The expert has also specified new trajectory 1560 connecting the point of departure "s" and the point of return "e" of proposed trajectory 1550 using spline 1564 with three waypoints. The new trajectory 1560 takes a wider path around bovine 1542, and should be safer for autonomous vehicle AVx123 than proposed trajectory 1550. In scenario 1500, a maximum speed for traveling along trajectory 1560 may be specified by dialog 1562, which shows a current maximum speed selection of 1.2 meters per second, a "+" button for incrementing the maximum speed, and an "−" for decrementing the maximum speed.

FIG. 15C shows spline 1564 using a dotted and dashed line connecting points "s" and "e" and the three waypoints using circled numbers "1", "2", and "3". In some embodiments, different techniques may be used to display trajectories proposed by autonomous vehicles and/or by experts; e.g., different colors, fonts, characters, etc. may be used to distinguish trajectories.

Feedback may be used to aid an expert in drawing a trajectory. For example, if show repellers button 1584 is selected, as shown in FIG. 15C, then trajectory interface 1510 may generate a vibration, sound, or graphical indication when a drawn trajectory touches a repeller or an object. As another example, if show attractors button 1582 is selected, trajectories may be pre-selected by trajectory interface 1510 that partially or completely follow one or more attractors that are unobstructed by objects. Other examples are possible as well.

While not shown in the figures, scenario 1500 may continue with the expert pressing send new trajectory button 1588. Pressing send new trajectory button 1588 may instruct trajectory interface 1510 to send trajectory 1560 to autonomous vehicle AVx123. Autonomous vehicle AVx123 may then examine trajectory 1560 and request approval of the trajectory. Upon receiving the request, trajectory interface 1510 may provide an indication of the request for approval. Then, the expert may press the approve trajectory 1590 button to send an approval to autonomous vehicle AVx123. Autonomous vehicle AVx123 may then drive along trajectory 1560 from point of departure "s" via waypoints "1", "2", and "3" to reach point of return "e". Upon reaching point "e", the stuck condition for autonomous vehicle AVx123 is relieved and scenario 1500 may end.

Figure 16:
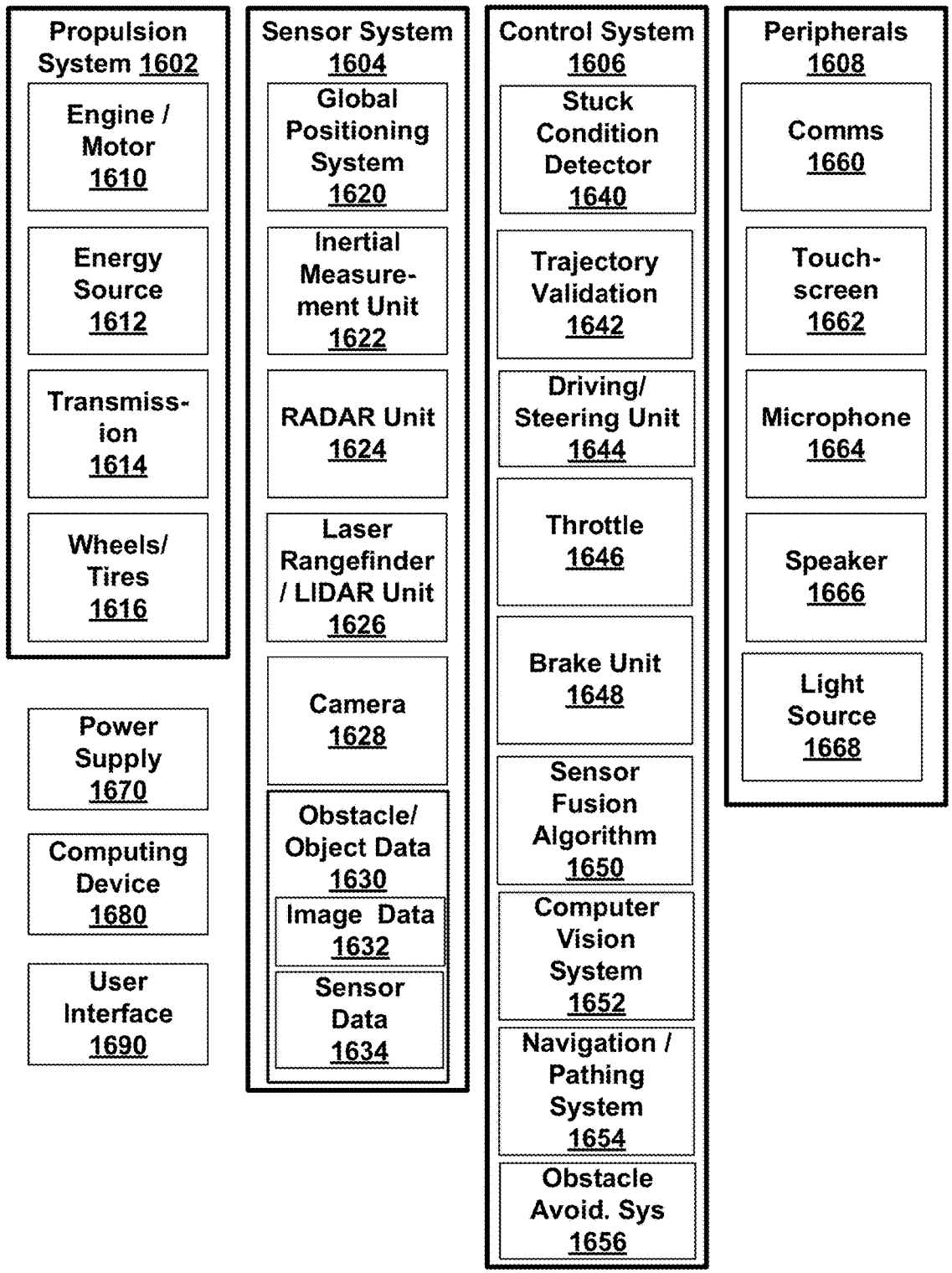
FIG. 16 is a functional block diagram illustrating an autonomous vehicle, according to an example embodiment.

FIG. 16 shows a block diagram of components of an example autonomous vehicle 1600. In some embodiments, autonomous vehicle 1600 may include at least some of the herein-described functionality of autonomous vehicles 510, 512, 514, 610, 810, 1010, and 1800. Additionally, autonomous vehicle 1600 may be configured to operate in an operational mode, such as a non-autonomous mode, a partially-autonomous mode, or an autonomous-operation mode.

The non-autonomous mode may use human input to select and execute driving behaviors during operation of the autonomous vehicle. In some instances, while in non-autonomous mode, the autonomous vehicle may operate like a traditional, non-autonomous vehicle.

The partially-autonomous mode may involve both a vehicle control system, such as control system 1606 of autonomous vehicle 1600, and human inputs to select driving behaviors during operation of autonomous vehicle 1600. For example, the autonomous vehicle control system may generate indications of driving behaviors for review by a human driver. For each indication, the human driver may review the indication and operate the autonomous vehicle by carrying out, modifying, or ignoring the indication. In some cases, the partially-autonomous mode may involve the autonomous vehicle performing all actions to navigate and drive the autonomous vehicle, where a human driver may monitor the autonomous vehicle's performance and intervene if and when necessary; e.g., to avert an accident. In other cases, as described herein, autonomous vehicle 1600 may request assistance from an assistance center; e.g., assistance center 520. Additional techniques for operating an autonomous vehicle in a partially-autonomous mode, such as auto-piloting and automatic parking, are possible as well.

In the autonomous-operation mode, the autonomous vehicle control system may select and execute driving behaviors along at least part of a route without human input. The autonomous-operation mode may be subdivided into an autonomous mode utilizing a trained driver, an autonomous mode with a non-trained human driver, and an autonomous mode without a human driver. In autonomous-mode operation with a human driver, the vehicle control 1606 system may be configured to receive feedback from the human passenger about driving quality of the autonomous vehicle, and, in some circumstances, for the human driver to operate the autonomous vehicle.

Autonomous vehicle 1600 may include various systems such as a propulsion system 1602, a sensor system 1604, a control system 1606, one or more peripherals 1608, as well as a power supply 1670, a computing device 1680, and a user interface 1690. Autonomous vehicle 1600 may include more or fewer systems and each system may include multiple aspects. Further, each of the systems and aspects of autonomous vehicle 1600 may be interconnected. Thus, one or more of the described functions of autonomous vehicle 1600 may be divided into additional functional or physical components, or combined into fewer functional or physical components. In some further examples, additional functional and/or physical components may be added to the examples illustrated by FIG. 16.

Propulsion system 1602 may include components operable to provide powered motion for autonomous vehicle 1600. In an example embodiment, propulsion system 1602 may include an engine/motor 1610, an energy source 1612, a transmission 1614, and wheels/tires 1616. Engine/motor 1610 may be any combination of an internal combustion engine, an electric motor, steam engine, Stirling engine, or other types of engines and/or motors. In some embodiments, engine/motor 1610 may be configured to convert energy source 1612 into mechanical energy. Propulsion system 1602 may include multiple types of engines and/or motors. For instance, a gas-electric hybrid car may include a gasoline engine and an electric motor. Other examples are possible.

Energy source 1612 may represent a source of energy that may, in full or in part, power engine/motor 1610. That is, engine/motor 1610 may be configured to convert energy source 1612 into mechanical energy. Examples of energy sources 1612 include gasoline, diesel, other petroleum-based fuels, propane, other compressed gas-based fuels, ethanol, solar panels, batteries, and other sources of electrical power. Energy source 1612 may additionally or alternatively include any combination of fuel tanks, batteries, capacitors, and/or flywheels. Energy source 1612 may also provide energy for other systems of autonomous vehicle 1600.

Transmission 1614 may include aspects that are operable to transmit mechanical power from engine/motor 1610 to wheels/tires 1616. To this end, transmission 1614 may include a gearbox, clutch, differential, and drive shafts. Transmission 1614 may include other aspects. The drive shafts may include one or more axles that may be coupled to the one or more wheels/tires 1616.

Wheels/tires 1616 of autonomous vehicle 1600 may be configured in various formats, including a unicycle, bicycle/motorcycle, tricycle, or car/truck four-wheel format. Other wheel/tire geometries are possible, such as those including six or more wheels. Any combination of wheels/tires 1616 of autonomous vehicle 1600 may be operable to rotate differentially with respect to other wheels/tires 1616. Wheels/tires 1616 may represent at least one wheel that is fixedly attached to transmission 1614 and at least one tire coupled to a rim of the wheel that may make contact with the driving surface. Wheels/tires 1616 may include any combination of metal and rubber, or another combination of materials.

Sensor system 1604 may include a number of sensors configured to sense information about an environment of autonomous vehicle 1600. For example, sensor system 1604 may include a GPS 1620, an inertial measurement unit (IMU) 1622, a radar unit 1624, a LIDAR unit 1626, and a camera 1628. Other sensors are possible as well. One or more of the sensors included in sensor system 1604 may be configured to be actuated separately and/or collectively in order to modify a position and/or an orientation of the one or more sensors.

GPS 1620 may be any sensor configured to estimate a geographic location of autonomous vehicle 1600. To this end, GPS 1620 may include a transceiver operable to provide information regarding the position of autonomous vehicle 1600 with respect to the Earth.

IMU 1622 may include any combination of sensors (e.g., accelerometers and gyroscopes) configured to sense position and orientation changes of autonomous vehicle 1600 based on inertial acceleration.

Radar unit 1624 may represent a system that utilizes radio signals to sense objects within the local environment of autonomous vehicle 1600. In some embodiments, in addition to sensing the objects, radar unit 1624 may additionally be configured to sense the speed and/or heading of the objects.

LIDAR unit 1626 may be any sensor configured to sense objects in the environment in which autonomous vehicle 1600 is located using lasers. In an example embodiment, LIDAR unit 1626 may include one or more laser sources, a laser scanner, and one or more detectors, among other system components. LIDAR unit 1626 may be configured to operate in a coherent (e.g., using heterodyne detection) or an incoherent detection mode. In some embodiments, LIDAR unit 1626 may include at least some of the herein-described functionality of LIDAR unit 1102.

Camera 1628 may include one or more devices configured to capture a plurality of images of the environment of autonomous vehicle 1600. Camera 1628 may be a still camera or a video camera, and may capable of recording images in the infrared, visible, and/or ultraviolet frequency ranges. Camera 1628 may operate in conjunction with light source 1668.

In some embodiments, obstacle data 1630 be stored as part of sensor system 1604. Obstacle data 1630 may include image data 1632 and sensor data 1634. Image data 1632 may include still and/or video images captured by autonomous vehicle 1600; e.g., using camera 1628. Sensor data may include location, radar, LIDAR, laser strike data, audio data, and/or other data captured by autonomous vehicle 1600; e.g., using GPS 1620, IMU 1622, radar unit 1624, LIDAR unit 1626, microphone 1664, and/or data generated by sensors within other components of autonomous vehicle 1600, such as but not limited to engine, brake, and tire sensors.

In some embodiments, sensor data 1634 may include low-level data, or raw data from sensors associated with autonomous vehicle 1600; e.g., radar data from radar unit 1624, laser-strike data from LIDAR unit 1626, and/or locations from GPS 1620 and IMU 1622. Alternatively or additionally, sensor data 1634 may include high-level data, or processed data from sensors associated with autonomous vehicle 1600. This high-level data may be derived, as least in part, from the low-level data.

In still other embodiments, sensor data 1634 may include both low-level and high-level data. In even other embodiments, part of all of obstacle/object data 1630 may be stored using computing device 1680, either as a copy of data stored in sensor system 1604, or rather than being stored in sensor system 1604.

In some embodiments, data storage associated with computer device 1680 may store object-detector software, code, or other program instructions. Such object-detector software may include, or be part of, one or more of the subsystems of the control system 1606 described below, including sensor fusion algorithm 1650, computer vision system 1652, and/or obstacle avoidance system 1656.

In some embodiments, the low level data and/or the high level data may be grouped or "bucketed" according to distance along a proposed trajectory of autonomous vehicle 1600. For example, suppose buckets of size R meters, R>0, are used. Then, data between X and X+R meters ahead of autonomous vehicle 1600 may be put into bucket X. In some embodiments, X is divisible by R. If bucket X includes more than a threshold number $T_{obj}$ of data objects, the proposed trajectory may be considered to intersect or come close to an obstacle somewhere between X meters and X+R meters ahead.

Buckets may be used to test a proposed trajectory for safety. For example, if a bucket along the proposed trajectory has more than $T_{obj}$ objects, then the proposed trajectory may be rejected by autonomous vehicle 1600. Similarly, if autonomous vehicle 1600 is driving along a trajectory and determines that a bucket between X1 meters ahead has more than $T_{obj}$ objects, then autonomous vehicle 1600 may come to controlled stop to avoid a collision approximately X1 meters away. Alternatively, if there is just one object blocking a trajectory, autonomous vehicle 1600 may reject the trajectory.

Control system 1606 may be configured to control operation of autonomous vehicle 1600 and its components. Accordingly, the control system 1606 may include various aspects include stuck condition detector 1640, trajectory validation unit 1642, driving/steering unit 1644, throttle 1646, brake unit 1648, a sensor fusion algorithm 1650, a computer vision system 1652, a navigation/pathing system 1654, and an obstacle avoidance system 1656. Control system 1606 may additionally or alternatively include components other than those shown and described.

Stuck condition detector 1640 may be configured to detect that the autonomous vehicle is in a stuck condition, so that autonomous vehicle 1600 may benefit from navigational assistance. In some embodiments, stuck condition detector 1640 may be a component of navigation-pathing system 1654. In other embodiments, stuck condition detector 1640 may be a component of obstacle avoidance system 1656.

Upon determining that autonomous vehicle 1600 is in a stuck condition, stuck condition detector 1640 may, in combination with communications component 1660, send an assistance request to request assistance. The assistance request may be sent to assistance center 520. In response, assistance center 520 may either (a) accept the assistance request and send a new trajectory for vehicle 1600 to navigate, or (b) reject the request. In some embodiments, autonomous vehicle 1600 may provide a proposed new trajectory to assistance center 520, either for validation, editing, or replacement by a trajectory proposed by assistance center 520. In some embodiments, the functions of assistance center 520 may be integrated with autonomous vehicle 1600, perhaps as a way for a human driver or rider of autonomous vehicle 1600 to assist autonomous vehicle 1600 out of a stuck condition.

Trajectory validation component 1642 may determine whether or not autonomous vehicle 1600 may follow a new trajectory proposed by assistance center 520. Trajectory validation component 1642 may validate the trajectory using data from sensors, such as indicated in sensor system 1604, and navigational constraints on autonomous vehicle 1600. In some embodiments, trajectory validation component 1642 may use buckets for validation as discussed elsewhere in this section. In other embodiments, assistance center 520 may provide temporary permission to autonomous vehicle 1600 to ignore some navigational constraints.

Driving/steering unit 1644 may include a steering unit representing any combination of mechanisms that may be operable to adjust the heading of autonomous vehicle 1600 and a driving unit. Driving/steering unit 1644 may be configured to drive in accordance with a trajectory, such as the original trajectory, and to accept modifications to the original trajectory and/or constraints based on a new trajectory, as well as any other information provided by assistance center 520. The new trajectory may be based on a point of departure, a path that may be specified as a spline, and a point of return to an original trajectory, such as discussed above at least in the context of FIGS. 15A-15C.

Throttle 1646 may be configured to control, for instance, the operating speed of the engine/motor 1610 and, in turn, control the speed of autonomous vehicle 1600.

Brake unit 1648 may include any combination of mechanisms configured to decelerate autonomous vehicle 1600. Brake unit 1648 may use friction to slow wheels/tires 1616. In some cases, brake unit 1648 may convert the kinetic energy of wheels/tires 1616 to electric current. Brake unit 1648 may take other forms as well.

Sensor fusion algorithm 1650 may be an algorithm (or a computer program product storing an algorithm) configured to accept data from sensor system 1604 as input. The data may include, for example, data representing information sensed at the sensors of sensor system 1604. Sensor fusion algorithm 1650 may include, for instance, a Kalman filter, Bayesian network, or other algorithm. Sensor fusion algorithm 1650 may further provide various assessments based on the data from sensor system 1604. In an example embodiment, the assessments may include evaluations of individual objects and/or features in the environment of autonomous vehicle 1600, evaluation of a particular situation, and/or evaluate possible impacts based on the particular situation. Sensor fusion algorithm 1650 may operate in conjunction with stuck condition detector 1640, trajectory validation system 1642, and/or other components of autonomous vehicle 1600.

Computer vision system 1652 may be any system operable to process and analyze images captured by camera 1630 in order to identify objects and/or features in the environment of autonomous vehicle 1600 that may include traffic signals, road way boundaries, and obstacles. Computer vision system 1652 may use an object recognition algorithm, a Structure from Motion (SFM) algorithm, video tracking, and other computer vision techniques. In some embodiments, computer vision system 1652 may be additionally configured to map an environment, track objects, estimate the speed of objects, etc. Computer vision system 1652 may operate in conjunction with stuck condition detector 1640, trajectory validation system 1642, and/or other components of autonomous vehicle 1600.

Navigation and pathing system 1654 may be any system configured to determine a driving path for autonomous vehicle 1600. Navigation and pathing system 1654 may additionally be configured to update the driving path dynamically while autonomous vehicle 1600 is in operation. In some embodiments, navigation and pathing system 1654 may be configured to incorporate data from sensor fusion algorithm 1650, GPS 1620, and one or more predetermined maps so as to determine a trajectory for autonomous vehicle 1600.

Obstacle avoidance system 1656 may represent a control system configured to identify, evaluate, and avoid or otherwise negotiate potential obstacles in the environment of autonomous vehicle 1600. Peripherals 1608 may be configured to allow interaction between autonomous vehicle 1600 and external sensors, other vehicles, other computer systems, and/or a user. For example, peripherals 1608 may include a communication system (comms) 1660, a touchscreen 1662, a microphone 1664, a speaker 1666, and/or a light source 1668.

Peripherals 1608 may provide, for instance, an interface for a user of autonomous vehicle 1600 to interact with autonomous vehicle 1600. To this end, touchscreen 1662 may provide information to a user of autonomous vehicle 1600. Touchscreen 1662 may also be configured to sense at least one of a position and a movement of a user's finger via capacitive sensing, resistance sensing, or a surface acoustic wave process, among other possibilities. Touchscreen 1662 may be capable of sensing finger movement in a direction parallel or planar to the touchscreen surface, in a direction normal to the touchscreen surface, or both, and may also be capable of sensing a level of pressure applied to the touchscreen surface. Touchscreen 1662 may be formed of one or more translucent or transparent insulating layers and one or more translucent or transparent conducting layers. Touchscreen 1662 may take other forms as well.

Peripherals 1608 may also provide facilitate communication between autonomous vehicle 1600 and devices within its environment. The microphone 1664 may be configured to receive audio (e.g., a voice command or other audio input) from a user of autonomous vehicle 1600. Similarly, speakers 1666 may be configured to output audio to the autonomous user of autonomous vehicle 1600.

Communication system 1660 may be a wireless communication system configured to wirelessly communicate with one or more devices directly or via a communication network. For example, communication system 1660 may use 3G cellular communication, such as Code-Division Multiple Access (CDMA), Evolution Data-Only (EVDO), or Universal Mobile Telecommunications System (UMTS), and/or 4G cellular communication, such as Worldwide Interoperability for Microwave Access (WiMAX) or Long Term Evolution (LTE). Alternatively, communication system 1660 may use a WLAN, for example, using WiFi. In some embodiments, communication system 1660 may communicate directly with a device, for example, using an infrared link, Bluetooth, or ZigBee. Other wireless protocols, such as various vehicular communication systems, are possible within the context of the disclosure. For example, communication system 1660 may include one or more dedicated short range communications (DSRC) devices that may include public and/or private data communications between vehicles and/or roadside stations. In some embodiments, communication system 1660 may be configured to communicate using wired communication.

Light source 1668 may generate and provide light to illuminate the environment of autonomous vehicle 1600, and may include, but is not limited to, one or more headlights, taillights, indicators, fog lights, light bulbs, halogen lights, light emitting diodes (LEDs), turn signals, beams, and lighting assemblies.

Power supply 1670 may provide power to various components of autonomous vehicle 1600 and may represent, for example, a rechargeable lithium-ion or lead-acid battery. In some embodiments, one or more banks of such batteries may be configured to provide electrical power. Other power supply materials and configurations are possible. In some embodiments, power supply 1670 and energy source 1612 may be implemented together, as in some all-electric cars.

Many or all of the functions of vehicle 1600 may be controlled by a computing device 1680. In some embodiments, computing device 1680 may include multiple computing devices. For example, computing device 1680 may control the function of autonomous vehicle 1600 based on inputs received from various systems (e.g., propulsion system 1602, sensor system 1604, and control system 1606), as well as from peripherals 1608. For example, computing device 1680 may utilize input from control system 1606 in order to control driving/steering unit 1654 to avoid an obstacle detected by sensor system 1604 and obstacle avoidance system 1656.

In an example embodiment, computing device 1680 may control many aspects of autonomous vehicle 1600 and its systems. In another example embodiment, computing device 1680 may be configured to carry out part or all of the herein-described methods; e.g., methods 100, 200, 300, 400, 700, and 1000 and/or perform some or all the autonomous vehicle functionality described herein. In some embodiments, computing device 1680 may be configured to store some or all of obstacle/object data 1630, video data 1632, and sensor data 1634.

Although FIG. 16 shows various components of autonomous vehicle 1600, such as communication system 1660 and computing device 1680, as being integrated into autonomous vehicle 1600, one or more of these components may be mounted or associated separately from autonomous vehicle 1600. For example, computing device 1680 may, in part or in full, exist separate from autonomous vehicle 1600. The device aspects that make up autonomous vehicle 1600 may be communicatively coupled together in a wired and/or wireless fashion.

Within the context of the present disclosure, the components of autonomous vehicle 1600 may be configured to work in an interconnected fashion with other components within or outside their respective systems. For instance, the camera 1628 may capture a plurality of images that may represent sensor data relating to an environment of autonomous vehicle 1600 operating in an autonomous mode. The environment may include another vehicle blocking a known traffic signal location ahead of autonomous vehicle 1600. Based on the plurality of images, an inference system (which may include computing device 1680, sensor system 1604, and control system 1606) may infer that the unobservable traffic signal is red based on sensor data from other aspects of the environment (for instance images indicating the blocking vehicle's brake lights are on). Based on the inference, computing device 1680 and propulsion system 1602 may act to control autonomous vehicle 1600.

Figure 17:
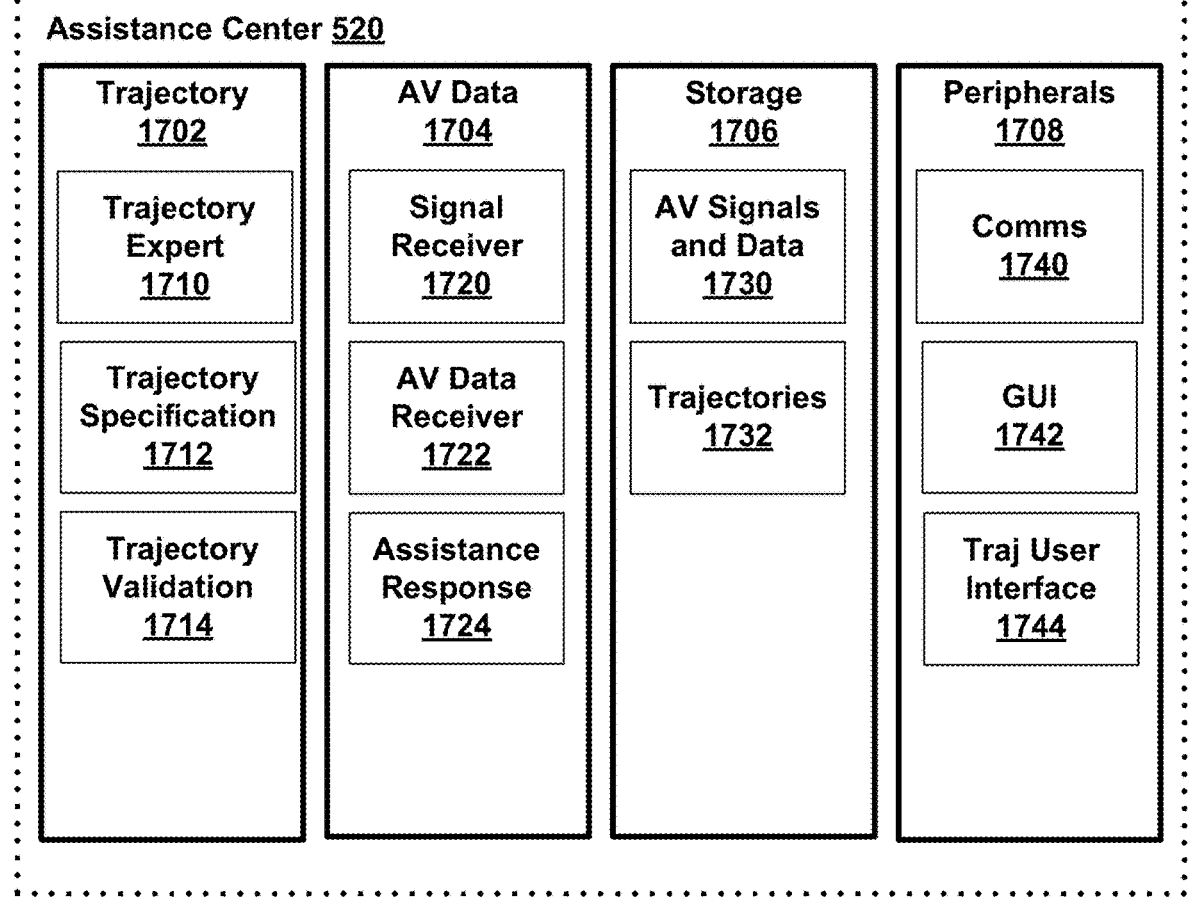
FIG. 17 is a functional block diagram illustrating an assistance center, according to an example embodiment.

FIG. 17 shows a block diagram of components of an example assistance center 520. Assistance center 520 may be configured with trajectory component 1702, autonomous vehicle data component 1704, storage component 1706, and peripheral component 1708. In some embodiments, assistance center 520 may have more, different, or fewer components than shown in FIG. 17.

Trajectory component 1702 may include trajectory expert 1710, trajectory specification component 1712, and trajectory validation component 1714. Trajectory expert 1710 may be configured to receive data from an autonomous vehicle in a stuck condition and determine a new trajectory for the autonomous vehicle to relieve the stuck condition. Trajectory expert 1710 may include a human expert, an expert system and/or other computer components configured for determining new trajectories, and/or a combination of human expert(s) and computer component(s). Trajectory specification component 1712 may be configured to enable trajectory expert 1710 to specify trajectories; e.g., receive a curve or points as input and generate a new trajectory as discussed above.

In some embodiments, an autonomous vehicle, such as autonomous vehicle 1600, may propose new trajectories to relieve stuck conditions. In these embodiments, trajectory validation component 1714 may be used to verify whether a trajectory provided by an autonomous vehicle may relieve a stuck condition. In particular embodiments, trajectory validation component 1714 may be used to validate trajectories from other sources, such as another assistance center or a stored set of trajectory of trajectories 1732 to determine whether the other-sourced trajectory may relieve the stuck condition.

Autonomous vehicle data components 1704 include signal receiver 1720, autonomous vehicle data receiver 1722, and assistance response 1724. Signal receiver 1720 may receive assistance signals, such as "heartbeat" signals and other signals from one or more autonomous vehicles. In some embodiments, signal receiver 1720 may be configured to receive periodic heartbeat signals from an autonomous vehicle informing assistance center 520 about a status of the autonomous vehicle. In some embodiments, assistance signals may be carried as part of heartbeat signals. Autonomous vehicle data receiver 1722 may receive data, such as but not limited to, sensor data, video data, audio data, object/obstacle information, and location data, from autonomous vehicle(s) contacting assistance center 520. Signal receiver 1720 and autonomous vehicle data receiver 1722 may be configured to store respective signals and data in storage components 1706.

Storage components may include representations of stored signals and data 1730 and trajectories 1732. Stored signals and data 1730 and trajectories 1732 may be configured so that trajectory expert 1710, or another component of assistance center 520, or even another assistance center, may query storage components 1706 to search for trajectories based on various criteria. These criteria may include, but are not limited to, a physical location, similarity to another trajectory, and/or how recently the stored trajectory was used. One or more trajectories found by such a search may be considered for use by an autonomous vehicle.

Peripheral components 1708 include communications components 1740 for communicating at least with autonomous vehicles as described herein, a graphical user interface (GUI) 1742 for displaying output displays (perhaps with a touch screen for receiving touch-based input), and trajectory user interface 1744 for use, e.g., by trajectory expert 1710, for specifying trajectories to trajectory specification component 1712 and/or trajectory validation component 1714. Other peripherals, such as keyboard(s), speaker(s), computer mice, additional displays, and/or printers, may be components of assistance center 520. In some embodiments, GUI 1742 may include or be replaced by a text or command-based user interface. GUI 1742 may display the screens shown in FIGS. 15A, 15B, and 15C, and may also support the function described in the context of these figures.

Figure 18:
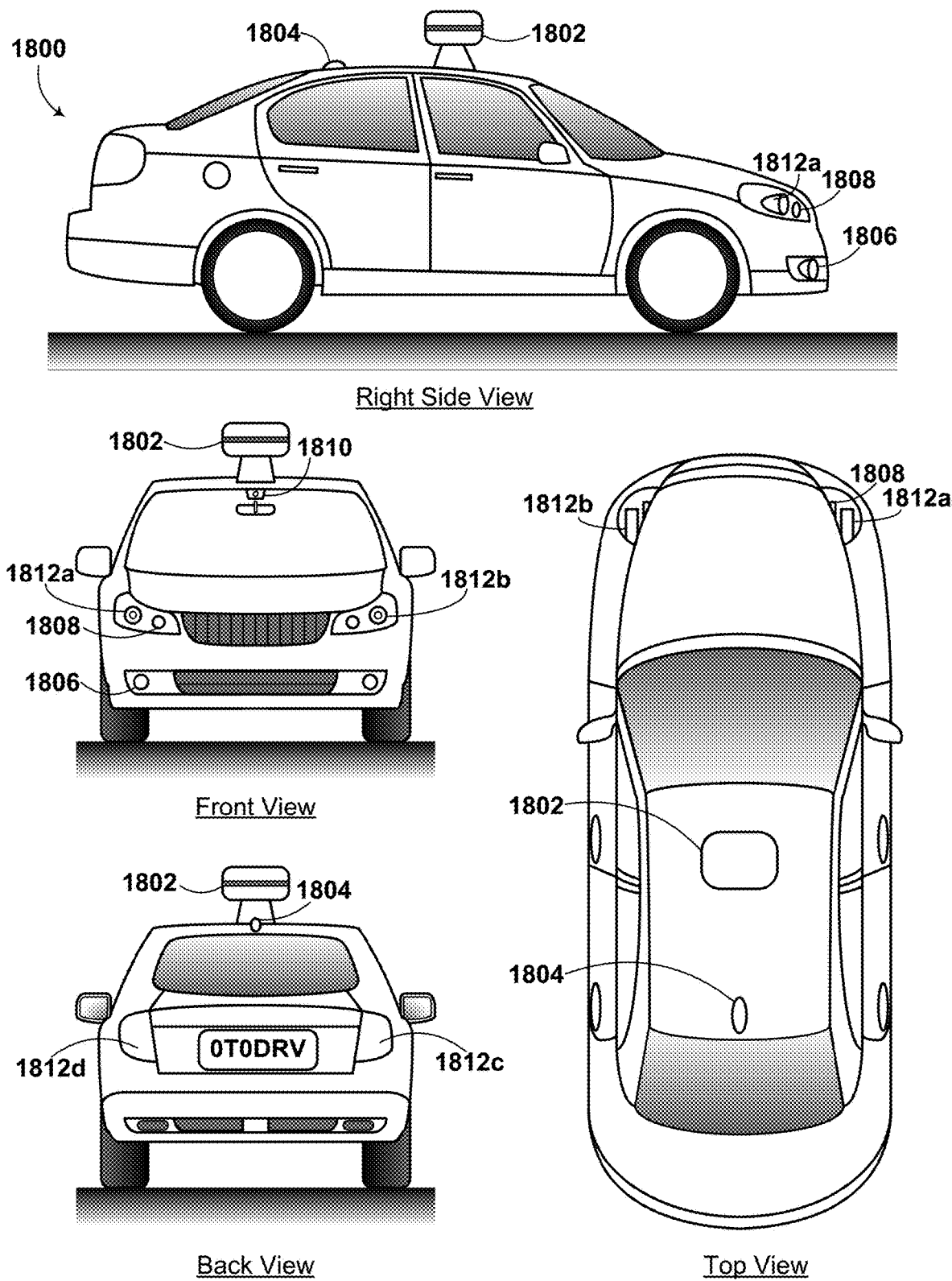
FIG. 18 shows a vehicle that may be similar or identical to the vehicle described with respect to FIG. 16, according to an example embodiment.

FIG. 18 depicts an autonomous vehicle 1800 that may be capable of carrying out one or more of the functions, methods, and/or processes described herein. For instance, autonomous vehicle 1800 may be similar or identical to autonomous vehicle 1600. Although autonomous vehicle 1800 is illustrated in FIG. 18 as a car, other embodiments are possible. For instance, autonomous vehicle 1800 may represent a truck, a van, a semi-trailer truck, a motorcycle, a golf cart, an off-road vehicle, or a farm vehicle, among other examples.

In some embodiments, autonomous vehicle 1800 may include a sensor unit 1802, a wireless communication system 1804, a LIDAR unit 1806, a laser rangefinder unit 1808, a camera 1810, and light sources 1812a, 1812b, 1812c, 1812d. The aspects of autonomous vehicle 1800 may include some or all of the aspects described for FIG. 16.

The sensor unit 1802 may include one or more different sensors configured to capture information about an environment of autonomous vehicle 1800. For example, sensor unit 1802 may include any combination of camera units, radar units, LIDAR units, range finders, and acoustic sensors. Other types of sensors are possible.

In an example embodiment, the sensor unit 1802 may include one or more movable mounts that may be operable to adjust the orientation of one or more sensors in the sensor unit 1802. In one embodiment, the movable mount may include a rotating platform that may scan sensors so as to obtain information from each direction around autonomous vehicle 1800. In another embodiment, the movable mount of the sensor unit 1802 may be movable in a scanning fashion within a particular range of angles and/or azimuths. The sensor unit 1802 may be mounted atop the roof of a car, for instance, however other mounting locations are possible. Additionally, the sensors of sensor unit 1802 may be distributed in different locations and might not be collocated in a single location. Some possible sensor types and mounting locations include LIDAR unit 1806 and laser rangefinder unit 1808. Furthermore, each sensor of sensor unit 1802 may be configured to be moved or scanned independently of other sensors of sensor unit 1802.

Wireless communication system 1804 may be located on a roof of autonomous vehicle 1800 as depicted in FIG. 18. Alternatively, wireless communication system 1804 may be located, fully or in part, elsewhere. Wireless communication system 1804 may include wireless transmitters and receivers that may be configured to communicate with devices external or internal to autonomous vehicle 1800. Specifically, wireless communication system 1804 may include transceivers configured to communicate with other vehicles and/or computing devices, for instance, in a vehicular communication system or a roadway station. Examples of such vehicular communication systems include wide-area wireless communication system (such as 3G and/or 4G cellular systems), WLAN systems, GPS systems, dedicated short range communications (DSRC), radio frequency identification (RFID), and other proposed communication standards directed towards intelligent transport systems.

Camera 1810 may be any camera (e.g., a still camera, a video camera, etc.) configured to capture a plurality of images of the environment of autonomous vehicle 1800. To this end, camera 1810 may be configured to detect visible light, or may be configured to detect light from other portions of the spectrum, such as infrared or ultraviolet light. Other types of cameras are possible as well.

Camera 1810 may be a two-dimensional detector, or may have a three-dimensional spatial range. In some embodiments, camera 1810 may be, for example, a range detector configured to generate a two-dimensional image indicating a distance from camera 1810 to a number of points in the environment. To this end, camera 1810 may use one or more range detecting techniques. For example, camera 1810 may use a structured light technique in which autonomous vehicle 1800 illuminates an object in the environment with a predetermined light pattern, such as a grid or checkerboard pattern and uses camera 1810 to detect a reflection of the predetermined light pattern off the object. Based on distortions in the reflected light pattern, autonomous vehicle 1800 may determine the distance to the points on the object. The predetermined light pattern may include infrared light, or light of another wavelength.

Camera 1810 may be mounted inside a front windshield of autonomous vehicle 1800. Specifically, as illustrated, camera 1810 may capture images from a forward-looking view with respect to autonomous vehicle 1800. Other mounting locations and viewing angles of camera 1810 are possible, either inside or outside autonomous vehicle 1800.

Camera 1810 may have associated optics that may be operable to provide an adjustable field of view. Further, camera 1810 may be mounted to autonomous vehicle 1800 with a movable mount that may be operable to vary a pointing angle of camera 1810. Camera 1810 may operate in conjunction with one or more of light sources 1812*a*, 1812*b*, 1812*c*, 1812*d*.

Each of light sources 1812*a*, 1812*b*, 1812*c*, 1812*d* may be a light source such as light source 1668 discussed above in the context of FIG. 16. For example, each of light sources 1812*a*, 1812*b* may be a head light. Each head light may be configured to generate and provide white or nearly white light and project the (nearly) white light in front of autonomous vehicle 1800. As another example, each of light sources 1812*c*, 1812*d* is a tail light. Each tail light may be configured to generate and provide yellow, red, and/or white light behind autonomous vehicle 1800. Other example light sources are possible as well, including but not limited to, additional light sources, light sources configured to provide different and/or additional colors of light, and light sources mounted in locations on autonomous vehicle 1800 other than shown in FIG. 18.

Figure 19A:
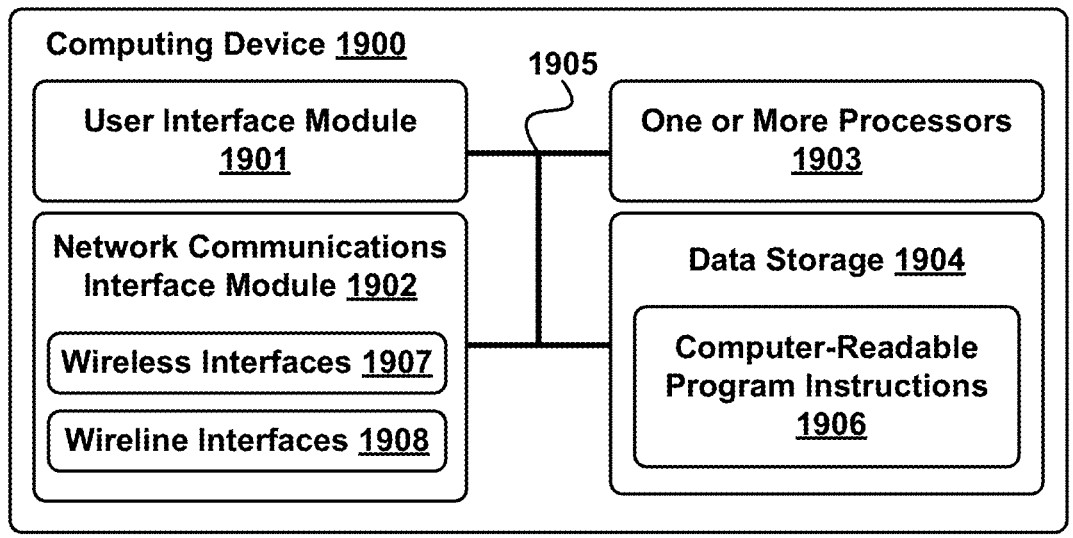
FIG. 19A is a block diagram of a computing device, according to an example embodiment.

FIG. 19A is a block diagram of computing device 1900, in accordance with an example embodiment. Computing device 1900 shown in FIG. 19A could be configured to perform one or more functions of computing device 1680, some or all of methods 100, 200, 300, 400, 700, and 1000, control some or all of the functionality of autonomous vehicles 510, 512, 514, 610, 810, 1010, 1110, 1600, and 1800, and/or some or all of the functionality of assistance center 520. Computing device 1900 may include a user interface module 1901, a network-communication interface module 1902, one or more processors 1903, and data storage 1904, all of which may be linked together via a system bus, network, or other connection mechanism 1905.

User interface module 1901 may be operable to send data to and/or receive data from external user input/output devices. For example, user interface module 1901 may be configured to send and/or receive data to and/or from user input devices such as a keyboard, a keypad, a touch screen, a computer mouse, a track ball, a joystick, a camera, a voice recognition module, and/or other similar devices. User interface module 1901 may also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 1901 may also be configured to generate audible output(s), such as a speaker, speaker jack, audio output port, audio output device, earphones, and/or other similar devices.

Network-communications interface module 1902 may include one or more wireless interfaces 1907 and/or one or more wireline interfaces 1908 that are configurable to communicate via a network. Wireless interfaces 1907 may include one or more wireless transmitters, receivers, and/or transceivers, such as a Bluetooth transceiver, a Zigbee transceiver, a WLAN transceiver, a WWAN transceiver, and/or other similar type of wireless transceiver configurable to communicate via a wireless network. Wireline interfaces 1908 may include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1902 may be configured to provide reliable, secured, and/or authenticated communications. For each communication described herein, information for ensuring reliable communications (i.e., guaranteed message delivery) may be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications may be made secure (e.g., be encoded or encrypted) and/or decrypted/decoded using one or more cryptographic protocols and/or algorithms, such as, but not limited to, the Data Encryption Standard (DES), the Advanced Encryption Standard (AES), Rivest-Shamir-Adleman (RSA), Diffie-Hellman, and/or other techniques. Thus, various cryptographic protocols and/or algorithms may be used to secure (and then decrypt/decode) communications.

Processors 1903 may include one or more general purpose processors and/or one or more special purpose processors (e.g., digital signal processors, application specific integrated circuits, etc.). Processors 1903 may be configured to execute computer-readable program instructions 1906 that are contained in data storage 1904 and/or other instructions as described herein.

Data storage 1904 may include one or more computer-readable storage media that may be read and/or accessed by at least one of processors 1903. The one or more computer-readable storage media may include volatile and/or non-volatile storage components, such as optical, magnetic, organic or other memory or disc storage, which may be integrated in whole or in part with at least one of processors 1903. In some embodiments, data storage 1904 may be implemented using a single physical device (e.g., one optical, magnetic, organic or other memory or disc storage unit), while in other embodiments, data storage 1904 may be implemented using two or more physical devices.

Data storage 1904 may include computer-readable program instructions 1906, and perhaps additional data. In some embodiments, data storage 1904 may additionally include storage used to perform at least part of the herein-described methods and techniques and/or at least part of the functionality of the herein-described devices and networks.

Figure 19B:
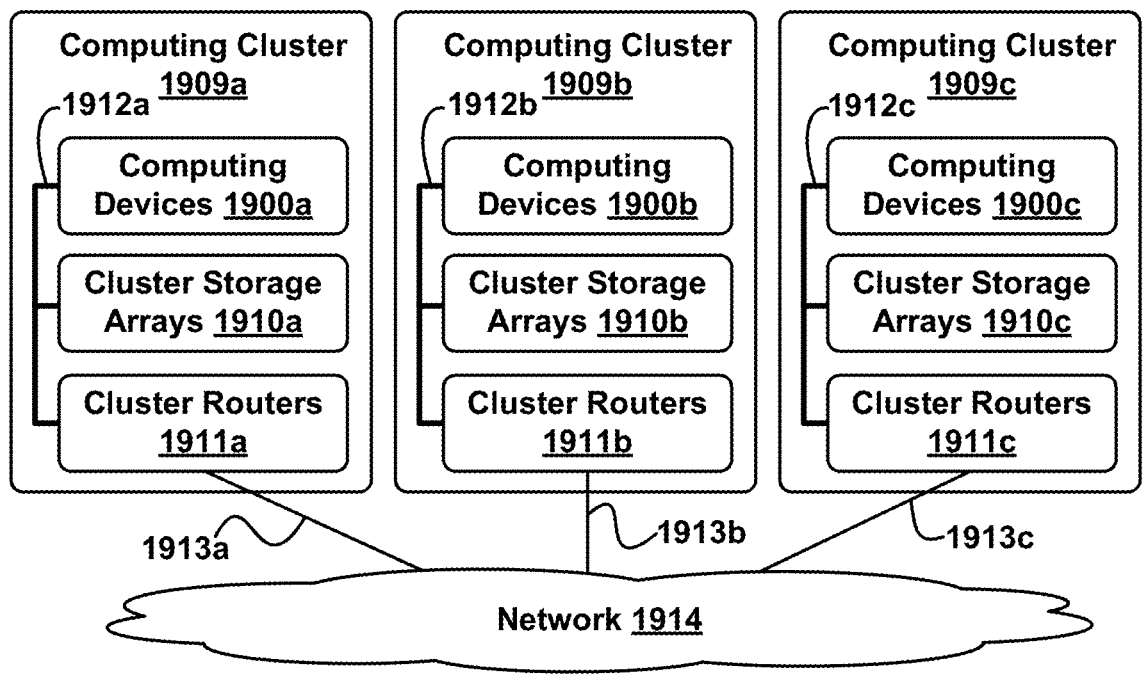
FIG. 19B depicts a network of computing clusters arranged as a server system, according to an example embodiment.

FIG. 19B depicts a network 1914 of computing clusters 1909a, 1909b, 1909c arranged as server system, in accordance with an example embodiment. Computing devices 1680 and/or 1900 may be included in such a cluster. In some embodiments, computing devices 1680 and/or 1900 may be a single computing devices residing in a single computing center; e.g., within autonomous vehicle 1600. In other embodiments, computing devices 1680 and/or 1900 may include multiple computing devices in a single computing center, or even multiple computing devices located in multiple computing centers located in diverse geographic locations.

In some embodiments, data and services at computing devices 1680 and/or 1900 may be encoded as computer readable information stored in non-transitory, tangible computer readable media (or computer readable storage media) and accessible by programmable devices, such as mobile devices, laptop or desktop computers, smart phones, and/or other computing devices. In some embodiments, data at computing devices 1680 and/or 1900 may be stored on a single disk drive or other tangible storage media, or may be implemented on multiple disk drives or other tangible storage media located at one or more diverse geographic locations.

FIG. 19B depicts a server system in accordance with an example embodiment. In FIG. 19B, the functions of computing devices 1680 and/or 1900 may be distributed among three computing clusters 1909a, 1909b, and 1909c. Computing cluster 1909a may include one or more computing devices 1900a, cluster storage arrays 1910a, and cluster routers 1911a connected by a local cluster network 1912a. Similarly, computing cluster 1909b may include one or more computing devices 1900b, cluster storage arrays 1910b, and cluster routers 1911b connected by a local cluster network 1912b. Likewise, computing cluster 1909c may include one or more computing devices 1900c, cluster storage arrays 1910c, and cluster routers 1911c connected by a local cluster network 1912c.

In some embodiments, each of computing clusters 1909a, 1909b, and 1909c may have an equal number of computing devices, an equal number of cluster storage arrays, and an equal number of cluster routers. In other embodiments, however, each computing cluster may have different numbers of computing devices, different numbers of cluster storage arrays, and different numbers of cluster routers. The number of computing devices, cluster storage arrays, and cluster routers in each computing cluster may depend on the computing task or tasks assigned to each computing cluster.

In computing cluster 1909a, for example, computing devices 1900a may be configured to perform various computing tasks of computing devices 1680 and/or 1900. In one embodiment, the various functionalities of computing devices 1680 and/or 1900 may be distributed among one or more of computing devices 1900a, 1900b, and 1900c. Computing devices 1900b and 1900c in computing clusters 1909b and 1909c may be configured similarly to computing devices 1900a in computing cluster 1909a. On the other hand, in some embodiments, computing devices 1900a, 1900b, and 1900c may be configured to perform different functions.

In some embodiments, computing tasks and stored data associated with computing devices 1680 and/or 1900 may be distributed across computing devices 1900a, 1900b, and 1900c based at least in part on the processing capacity of computing devices 1680 and/or 1900, the processing capabilities of computing devices 1900a, 1900b, and 1900c, the latency of the network links between the computing devices in each computing cluster and between the computing clusters themselves, and/or other factors that may contribute to the cost, speed, fault-tolerance, resiliency, efficiency, and/or other design goals of the overall system architecture.

The cluster storage arrays 1910a, 1910b, and 1910c of the computing clusters 1909a, 1909b, and 1909c may be data storage arrays that include disk array controllers configured to manage read and write access to groups of hard disk drives. The disk array controllers, alone or in conjunction with their respective computing devices, may also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of computing devices 1680 and/or 1900 may be distributed across computing devices 1900a, 1900b, and 1900c of computing clusters 1909a, 1909b, and 1909c, various active portions and/or backup portions of these components may be distributed across cluster storage arrays 1910a, 1910b, and 1910c. For example, some cluster storage arrays may be configured to store the data of one or more computing device(s) 1680 and/or 1900, while other cluster storage arrays may store data of other computing device(s) 1680 and/or 1900. Additionally, some cluster storage arrays may be configured to store backup versions of data stored in other cluster storage arrays.

Cluster routers 1911a, 1911b, and 1911c in computing clusters 1909a, 1909b, and 1909c may include networking equipment configured to provide internal and external communications for the computing clusters. For example, cluster routers 1911a in computing cluster 1909a may include one or more internet switching and routing devices configured to provide (i) local area network communications between computing devices 1900a and cluster storage arrays 1901a via local cluster network 1912a, and (ii) wide area network communications between computing cluster 1909a and computing clusters 1909b and 1909c via wide area network connection 1913a to network 1914. Cluster routers 1911b and 1911c may include network equipment similar to cluster routers 1911a, and cluster routers 1911b and 1911c may perform similar networking functions for computing clusters 1909b and 1909b that cluster routers 1911a perform for computing cluster 1909a.

In some embodiments, the configuration of cluster routers 1911a, 1911b, and 1911c may be based at least in part on the data communication capacity of the computing devices and cluster storage arrays, the data communications capabilities of the network equipment in the cluster routers 1911a, 1911b, and 1911c, the latency and throughput of local networks 1912a, 1912b, 1912c, the latency, throughput, and cost of wide area network links 1913a, 1913b, and 1913c, and/or other factors that may contribute to the cost, speed, fault-tolerance, resiliency, efficiency and/or other design goals of the moderation system architecture.

The above detailed description describes various features and functions of the disclosed systems, devices, and methods with reference to the accompanying figures. In the figures, similar symbols typically identify similar components, unless context indicates otherwise. The example embodiments described herein and in the figures are not meant to be limiting. Other embodiments may be utilized, and other changes may be made, without departing from the scope of the subject matter presented herein. It will be readily understood that aspects of the present disclosure, as generally described herein, and illustrated in the figures, may be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that may be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments may include more or less of each element shown in a given figure. Further, some of the illustrated elements may be combined or omitted. Yet further, an example embodiment may include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
based on sensor input, detecting, by an autonomous vehicle, a condition in which the autonomous vehicle is impeded from traveling according to a first trajectory;
transmitting, by a communication unit of the autonomous vehicle and by way of a wireless network, an assistance signal to an assistance center that is remote from the autonomous vehicle, wherein the assistance signal indicates that the autonomous vehicle seeks assistance traveling according to the first trajectory;
receiving, by the communication unit of the autonomous vehicle and by way of the wireless network, a response to the assistance signal, wherein the response includes a representation of a second trajectory; and
instructing, by a control unit of the autonomous vehicle, the autonomous vehicle to travel according to the second trajectory.

2. The method of claim 1, further comprising:
before receiving the response to the assistance signal, receiving, from the assistance center, a request for sensor data; and
in response to receiving the request for sensor data, transmitting, to the assistance center, the requested sensor data.

3. The method of claim 2, further comprising:
before transmitting the requested sensor data, obtaining the requested sensor data from one or more sensors of the autonomous vehicle.

4. The method of claim 1, wherein the second trajectory ignores a presence of at least one object that obstructs the first trajectory.

5. The method of claim 1, wherein the second trajectory is different from the first trajectory and the second trajectory intersects the first trajectory at two or more points.

6. The method of claim 1, wherein the second trajectory is different from the first trajectory and the second trajectory is a modified version of the first trajectory.

7. The method of claim 1, wherein the second trajectory and the first trajectory are identical.

8. The method of claim 1, wherein detecting the condition in which the autonomous vehicle is impeded from traveling according to the first trajectory comprises:

identifying a cause for the autonomous vehicle to be impeded from traveling according to the first trajectory;
starting a timer, wherein length of the timer is based on the cause; and
after the timer expires, determining that the cause is still impeding the autonomous vehicle from traveling according to the first trajectory.

9. The method of claim 1, further comprising:
after traveling according to the second trajectory, determining that the autonomous vehicle can safely return to traveling according to the first trajectory; and
in response to determining that the autonomous vehicle can safely return to traveling according to the first trajectory, instructing the autonomous vehicle to travel according to the first trajectory.

10. An autonomous vehicle comprising:
a sensor unit;
a communication unit;
a propulsion unit; and
a control unit configured to:
based on input from the sensor unit, detect a condition in which the autonomous vehicle is impeded from traveling according to a first trajectory;
cause the communication unit to transmit, by way of a wireless network, an assistance signal to an assistance center that is remote from the autonomous vehicle, wherein the assistance signal indicates that the autonomous vehicle seeks assistance traveling according to the first trajectory;
receive, by of the communication unit and by way of the wireless network, a response to the assistance signal, wherein the response includes a representation of a second trajectory; and
instruct the propulsion unit to cause the autonomous vehicle to travel according to the second trajectory.

11. The autonomous vehicle of claim 10, wherein the control unit is further configured to:
before receiving the response to the assistance signal, receive, by way of the communication unit and from the assistance center, a request for sensor data; and
in response to receiving the request for sensor data, cause the communication unit to transmit, to the assistance center, the requested sensor data.

12. The autonomous vehicle of claim 11, wherein the control unit is further configured to:
before transmitting the requested sensor data, obtaining the requested sensor data from the sensor unit.

13. The autonomous vehicle of claim 10, wherein the second trajectory ignores a presence of at least one object that obstructs the first trajectory.

14. The autonomous vehicle of claim 10, wherein the second trajectory is different from the first trajectory and the second trajectory intersects the first trajectory at two or more points.

15. The autonomous vehicle of claim 10, wherein the second trajectory is different from the first trajectory and the second trajectory is a modified version of the first trajectory.

16. A non-transitory computer readable medium storing instructions thereon that, when executed by one or more processors of a control unit, cause the control unit to perform operations comprising:
based on sensor input, detecting a condition in which an autonomous vehicle is impeded from traveling according to a first trajectory;
transmitting, by way of a wireless network, an assistance signal to an assistance center that is remote from the autonomous vehicle, wherein the assistance signal indicates that the autonomous vehicle seeks assistance traveling according to the first trajectory;
receiving, by way of a wireless network, a response to the assistance signal, wherein the response includes a representation of a second trajectory; and
instructing the autonomous vehicle to travel according to the second trajectory.

17. The non-transitory computer readable medium of claim 16, the operations further comprising:
before receiving the response to the assistance signal, receiving, from the assistance center, a request for sensor data; and
in response to receiving the request for sensor data, transmitting, to the assistance center, the requested sensor data.

18. The non-transitory computer readable medium of claim 17, the operations further comprising:
before transmitting the requested sensor data, obtaining the requested sensor data from one or more sensors of the autonomous vehicle.

19. The non-transitory computer readable medium of claim 16, wherein the second trajectory ignores a presence of at least one object that obstructs the first trajectory.

20. The non-transitory computer readable medium of claim 16, wherein the second trajectory is different from the first trajectory and the second trajectory intersects the first trajectory at two or more points.

* * * * *